United States Patent
Nagai et al.

(10) Patent No.: US 11,065,558 B2
(45) Date of Patent: Jul. 20, 2021

(54) STATIONARY PHASE FOR SUPERCRITICAL FLUID CHROMATOGRAPHY

(71) Applicant: DAICEL CORPORATION, Osaka (JP)

(72) Inventors: Kanji Nagai, Himeji (JP); Satoshi Shinkura, Himeji (JP)

(73) Assignee: DAICEL CORPORATION, Osaka (JP)

(*) Notice: Subject to any disclaimer, the term of this patent is extended or adjusted under 35 U.S.C. 154(b) by 826 days.

(21) Appl. No.: 15/560,933

(22) PCT Filed: Mar. 24, 2016

(86) PCT No.: PCT/JP2016/059456
§ 371 (c)(1),
(2) Date: Sep. 22, 2017

(87) PCT Pub. No.: WO2016/152996
PCT Pub. Date: Sep. 29, 2016

(65) Prior Publication Data
US 2018/0050282 A1   Feb. 22, 2018

(30) Foreign Application Priority Data

Mar. 24, 2015 (JP) ............... JP2015-061483

(51) Int. Cl.
*B01D 15/40* (2006.01)
*G01N 30/88* (2006.01)
(Continued)

(52) U.S. Cl.
CPC ............ *B01D 15/40* (2013.01); *B01J 20/28* (2013.01); *B01J 20/281* (2013.01); *B01J 20/288* (2013.01);
(Continued)

(58) Field of Classification Search
CPC ........ B01D 15/40; G01N 30/02; G01N 30/88; C08F 2/44; B01J 20/3278; B01J 20/3293;
(Continued)

(56) References Cited

U.S. PATENT DOCUMENTS

2006/0247362 A1   11/2006   Shah
2013/0133516 A1   5/2013   Okano et al.
(Continued)

FOREIGN PATENT DOCUMENTS

EP   2 848 932 A1   3/2015
JP   2003-337125 A   11/2003
(Continued)

OTHER PUBLICATIONS

Extended European Search Report dated Oct. 11, 2018, issued in corresponding European Patent Application No. 16768899.3.
(Continued)

*Primary Examiner* — Xin Y Zhong
(74) *Attorney, Agent, or Firm* — Birch, Stewart, Kolasch & Birch, LLP

(57) ABSTRACT

Provided is a stationary phase for supercritical fluid chromatography, the stationary phase having satisfactory molecule-identifying ability, in particular, satisfactory separating properties with respect to not only acidic compounds or basic compounds but also fused aromatic compounds or aromatic isomers. The stationary phase for supercritical fluid chromatography includes a support having, bonded thereto, a polymer in which the main chain has nitrogenous aromatic rings in the repeating units.

6 Claims, 20 Drawing Sheets

(51) Int. Cl.
*G01N 30/02* (2006.01)
*C08F 2/44* (2006.01)
*B01J 20/32* (2006.01)
*B01J 20/28* (2006.01)
*B01J 20/288* (2006.01)
*B01J 20/281* (2006.01)
*B01J 20/30* (2006.01)
*C08L 39/00* (2006.01)

(52) U.S. Cl.
CPC ... *B01J 20/28016* (2013.01); *B01J 20/28042* (2013.01); *B01J 20/30* (2013.01); *B01J 20/3204* (2013.01); *B01J 20/3219* (2013.01); *B01J 20/3278* (2013.01); *B01J 20/3293* (2013.01); *C08F 2/44* (2013.01); *C08L 39/00* (2013.01); *G01N 30/02* (2013.01); *G01N 30/88* (2013.01)

(58) Field of Classification Search
CPC .............. B01J 20/28016; B01J 20/3204; B01J 20/28042; B01J 20/288; B01J 20/3219; B01J 20/28; B01J 20/281; B01J 20/30; C08L 39/00
See application file for complete search history.

(56) References Cited

U.S. PATENT DOCUMENTS

2015/0182943 A1* 7/2015 Shibata .................. B01J 20/285
502/402
2016/0168302 A1 6/2016 Ikegami et al.
2016/0184736 A1* 6/2016 Wyndham .......... B01J 20/28004
210/656

FOREIGN PATENT DOCUMENTS

| JP | 2007-327041 A | 12/2007 | | |
|---|---|---|---|---|
| WO | WO 2012/023615 A | 2/2012 | | |
| WO | WO 2014/017280 A1 | 1/2014 | | |
| WO | WO-2014017280 A1 * | 1/2014 | .......... | B01J 20/3272 |
| WO | WO 2015/005361 A1 | 1/2015 | | |

OTHER PUBLICATIONS

Ihara et al., "Poly(4-Vinylpyridine) as Novel Organic Phase for RP-HPLC. Unique Selectivity for Polycyclic Aromatic Hydrocarbons", Journal of Liquid Chromatography and Related Technologies, vol. 26, No. 15, 2003, pp. 2491-2503.
International Search Report issued in PCT/JP2016/059456 (PCT/ISA/210), dated Jun. 14, 2016.
Perrenoud et al., Evaluation of stationary phases packed with superficially porous particles for the analysis of pharmaceutical compounds using supercritical fluid chromatography, Journal of Chromatography A, vol. 1360, Aug. 1, 2014, pp. 275-287.
West et al., "Chemometric methods to classify stationary phases for achiral packed column supercritical fluid chromatography", Journal of Chemometrics, vol. 26, Feb. 22, 2012, pp. 52-65.
West et al., "Effects of mobile phase composition on retention and selectivity in achiral supercritical fluid chromatography", Journal of Chromatography A, vol. 1302, Jun. 13, 2013, pp. 152-162.
West et al., "Orthogonal screening system of columns for supercritical fluid chromatography", Journal of Chromatography A, vol. 1203, Jul. 11, 2008, pp. 105-113.
Written Opinion of the International Searching Authority issued in PCT/JP2016/059456 (PCT/ISA/237), dated Jun. 14, 2016.
International Preliminary Report on Patentability and English translation of the Written Opinion of the International Searching Authority (forms PCT/IB/373, PCT/ISA/237 and PCT/IB/338), dated Oct. 5, 2017, for corresponding International Application No. PCT/JP2016/059456.

* cited by examiner

STATIONARY PHASE FOR SUPERCRITICAL FLUID CHROMATOGRAPHY

TECHNICAL FIELD

This invention relates to a chromatographic technique. More specifically, the invention relates to a stationary phase that can be used in supercritical fluid chromatography.

BACKGROUND ART

Chromatography is the most effective means for analyzing the components of a mixture and their contents, and for their separation and purification. This technology utilizes substance-specific distribution ratios (also understood to be adsorption equilibria) between a porous solid (stationary phase) that is spatially immobilized within a tube referred to as the "column" or "capillary" and a fluid (mobile phase) that moves through interstices in the stationary phase to separate different substances. Typical examples include gas chromatography and liquid chromatography. The former uses a gas as the mobile phase.

However, in order for the substances that are to be separated to mix with and move together with the gas phase, they must have at least a given vapor pressure. Hence, gas chromatography can be applied only to a relatively limited range of analytes that have a low molecular weight and are free of charge. On the other hand, liquid chromatography uses a liquid as the mobile phase and, by selecting a suitable mobile phase, can be applied to most substances. However, because liquids generally have a high viscosity, even if one were to attempt to obtain good separation by means of a long column or capillary, limitations are imposed by the increase in viscosity resistance.

Supercritical fluid chromatography (SFC) was developed as a technique that can overcome the drawbacks of both gas chromatography and liquid chromatography. It utilizes certain characteristics of fluids in a supercritical or subcritical state; namely, that such fluids dissolve other compounds much better than gases, and that they have a lower viscosity and a higher diffusion rate than liquids. SFC that uses carbon dioxide as the supercritical fluid is commonly employed on account of its safety and also for equipment-related reasons, and its use is gradually spreading. Other techniques include chromatography that utilizes electrical attraction, and thin-layer chromatography (a variant of liquid chromatography) in which paper or a powder is consolidated into a thin film, but the range of application for these techniques is not very broad.

The typical modes in liquid chromatography are normal phase chromatography which uses the combination of a high-polarity stationary phase and a low-polarity stationary phase, and reverse phase chromatography in which the polarities are the reverse of this. Recently, a technique called HILIC in which both phases are polar has also attracted attention. Other techniques based on specific interactions, such as ligand exchange chromatography which utilizes interactions between metal ions and ligands, and affinity chromatography which utilizes biochemical interactions are also known. In general, the mechanisms and characteristics of such separation are well understood, with technological progress based for the most part on improvements in the particle shape so as to increase the efficiency of separation.

The features of supercritical fluid chromatography (SFC) are reportedly similar to those of normal phase chromatography. Yet, much concerning the features and mechanisms of SFC is not yet well understood.

Stationary phases that can be used in SFC include, as discussed in Non-Patent Document 1, silica gel and silica gel that has been surface-modified with various atomic groups.

Exemplary modifying groups include groups having saturated alkyl chains of various chain lengths, groups in which one or two benzene rings or condensed polycyclic aromatic hydrocarbon groups are connected by an alkyl chain or an alkyl chain containing an amide or ether linkage, groups featuring a halogen-substituted benzene ring, groups in which halogenated alkyl groups are linked together, groups in which polar groups such as 2,3-dihydroxypropyl groups, CN groups or $NH_2$ groups are linked together, and polymeric modifying groups such as crosslinked polystyrene, polyvinyl alcohol or polyethylene glycol. Carbon having a graphite structure is also a distinctive stationary phase. Of these, in SFC in particular, frequent use is made of a stationary phase having (2-pyridyl)ethyl groups bonded therein, referred to as "2-ethylpyridine." This is favored for use, not only because even basic compounds that result in broad peaks due to tailing in ordinary stationary phases are eluted as sharp peaks, but also because acidic compounds can be suitably retained as well.

Yet, as pointed out in Non-Patent Document 2, there are also many stationary phases which have similar retention tendencies for various compounds and thus lack differences in their retention characteristics. In light of this, the inventors, recognizing that the ability to distinguish between molecules of closely similar structures is one essential condition that is being called for, have carried out extensive efforts to develop a stationary phase that can be used in SFC.

The vast majority of stationary phases for SFC that have been used to date are silica gels or silica gels which are surface-modified with various low-molecular-weight compounds. At the same time, stationary phases that are silica gels surface-modified with polymers have also been reported in the literature. For example, Patent Document 1 uses polymers having aromatic rings and dipolar atomic groups on repeating units of the main chain as the stationary phase; it is known that these not only are effective for separating various compounds, but also have good molecular shape recognition properties. However, unlike the above-described 2-ethylpyridine column, one problem has been that tailing occurs during the analysis of basic substances, giving broad peaks.

These stationary phases are prepared by supporting the polymer on a particulate or monolithic support. Therefore, when a solvent capable of dissolving the polymer or a mixed solvent containing such a solvent is used as the developing solvent, some or all of the polymer may dissolve, resulting in a loss of function as a chromatography column.

The inventors have looked at the accumulation and durability of multi-point interactions and dipole moments in polymers, and conducted intensive research on novel polymer-based SFC stationary phases. In particular, for such reasons as the availability of commercial products, the diversity of molecular design, the simplicity of monomer synthesis, and the ease of immobilization on silica gel surfaces, they have concentrated their efforts on the development of stationary phases based on vinyl polymers.

Up until now, as described in Non-Patent Document 3 and Patent Document 2, vinyl polymers have been used as the stationary phase for high-performance liquid chromatography. In these examples, poly(4-vinylpyridine) that is chemically bonded onto a silica gel surface is used and has been shown to be effective for separating various compounds. Although this is fascinating, such use has been limited to high-performance liquid chromatography, and the separation examples described are limited to polycyclic aromatic compounds, condensed ring compounds and analogs thereof. Moreover, the polymer being used is limited to poly(4-vinylpyridine); the influence of vinyl pyridine isomeric polymers and other nitrogen-containing aromatic polymers on the separation behavior is unclear.

CITATION LIST

Patent Literature

[Patent Document 1] WO 2014/017280
[Patent Document 2] Japanese Patent Application Publication No. 2003-337125

Non Patent Literature

[Non-Patent Document 1] C. West et al., J. Chromatogr. A, 1203 (2008), 105.
[Non-Patent Document 2] C. West et al., J. Chemometrics, 26(2012), 52.
[Non-Patent Document 3] H. Ihara et al., J. Chromatogr. Relat. Technol. 26(2003), 2491.

SUMMARY OF INVENTION

Technical Problem

The object of this invention is to provide a stationary phase for supercritical fluid chromatography which resolves the above problems, has good molecular recognition, and has good separation characteristics, particularly for acidic compounds and basic compounds, and also for condensed ring aromatic compounds and aromatic isomers.

Solution to Problem

The inventors have conducted extensive research aimed at resolving the above problems, as a result of which they have discovered that a stationary phase made of a support to which is bonded a polymer that includes a nitrogen-containing aromatic ring on repeating units of the main chain exhibits good molecular recognition in supercritical fluid chromatography.

The invention is described below.
[1] A stationary phase for supercritical fluid chromatography which has a support to which is bonded a polymer that includes a nitrogen-containing aromatic ring on repeating units of the main chain.
[2] The stationary phase for supercritical fluid chromatography according to [1], wherein the nitrogen-containing aromatic ring is a group having a heterocyclic structure selected from pyridyl, imidazole, carbazole and pyrazyl groups.
[3] The stationary phase for supercritical fluid chromatography according to [1] or [2], which is in the form of spherical particles.
[4] The stationary phase for supercritical fluid chromatography according to [3], which has an average particle size of from 0.1 μm to 1,000 μm.
[5] The stationary phase for supercritical fluid chromatography according to [1] or [2], which is monolithic.
[6] A method for separating a target substance, the method including a step of separating the target substance using the stationary phase according to any of [1] to [5] and a supercritical fluid-containing mobile phase.
[7] A method for producing a stationary phase for supercritical fluid chromatography, the method including a step of copolymerizing a vinyl monomer having a nitrogen-containing aromatic ring or an isopropenyl monomer having a nitrogen-containing aromatic ring with a support having a polymerizable functional group bonded thereto.
[8] The method for producing a stationary phase for supercritical fluid chromatography according to [7], wherein the polymerizable functional group is a vinyl group, an allyl group, an isopropenyl group or an alkenyl group of 4 to 12 carbon atoms having a double bond at the ω position.
[9] The method for producing a stationary phase for supercritical fluid chromatography according to [7] or [8], wherein the support having a polymerizable functional group bonded thereto is a surface-modified silica gel obtained by silane coupling a compound of formula (I) below with silica gel.
[C1]

$$W\text{—}X\text{—}Y\text{—}SiR_{3-n}Z_n \qquad (I)$$

(where W is a vinyl group, an allyl group, an isopropenyl group or an alkenyl group of 4 to 12 carbon atoms having a double bond at the ω position; X is an amide group, an ester group, an N-alkylamide group of 1 to 3 carbon atoms, an ether group, a sulfoxide group, a sulfone group, a sulfide group or a phosphoric acid ester group; Y is an alkylene group of 1 to 30 carbon atoms; Z is an alkylene group of 1 to 30 carbon atoms; each R is independently an alkyl group of 1 to 5 carbon atoms; Z is a leaving group that can form a bond between the silicon atom in formula (I) and the support; and n is an integer from 1 to 3).
[10] The method for producing a stationary phase for supercritical fluid chromatography according to [9], wherein W is a vinyl group; X is an amide group or an N-alkylamide group of 1 to 3 carbon atoms; Y is an alkylene group of 1 to 5 carbon atoms; each R is independently a methyl group, an ethyl group or a propyl group; Z is an alkoxy group of 1 to 5 carbon atoms, a halogen, an alkylmercaptyl group of 1 to 20 carbon atoms, a dimethylamino group, a diethylamino group, a pyrrolidino group, an imidazolyl group, an allyl group or a 2-methyl-2-propenyl group.
[11] A method for producing a stationary phase for supercritical fluid chromatography, the method including: a step of obtaining a polymer by radical polymerizing a vinyl monomer having a nitrogen-containing aromatic ring or an isopropenyl monomer having a nitrogen-containing aromatic ring in the presence of a chain transfer agent having on an end thereof a crosslinkable silyl group; and a step of silane coupling the resulting polymer on a support surface.
[12] The method for producing a stationary phase for supercritical fluid chromatography according to [11], wherein the chain transfer agent having on an end thereof a crosslinkable silyl group is a compound of formula (III) below:
[C2]

$$R_{3-n}Z_n Si\text{—}Y\text{-}T \qquad (III)$$

(where each R is independently an alkyl group of 1 to 5 carbon atoms; Z is a leaving group that can form a bond between the silicon atom in formula (III) and the support; Y is an alkylene group of 1 to 30 carbon atoms; T is a chain-transferring functional group; and n is an integer from 1 to 3).
[13] The method for producing a stationary phase for supercritical fluid chromatography according to any of [7] to [12], wherein the vinyl monomer having a nitrogen-containing aromatic ring is 4-vinylpyridine, 3-vinylpyridine, 2-vinylpyridine, 1-vinylimidazole, 9-vinylcarbazole or 2-vinylpyrazine, and the isopropenyl monomer having a nitrogen-containing aromatic ring is 2-isopropenylpyridine, 3-isopropenylpyridine, 4-isopropenylpyridine, 1-isopropenylimidazole, 9-isopropenylcarbazole or 2-isopropenylpyrazine.

Effects of Invention

This invention makes it possible to provide a stationary phase for supercritical fluid chromatography which has good molecular recognition and has good separation characteristics, particularly for acidic compounds and basic compounds, and also for condensed ring aromatic compounds and aromatic isomers.

DESCRIPTION OF EMBODIMENTS

Figure 1:
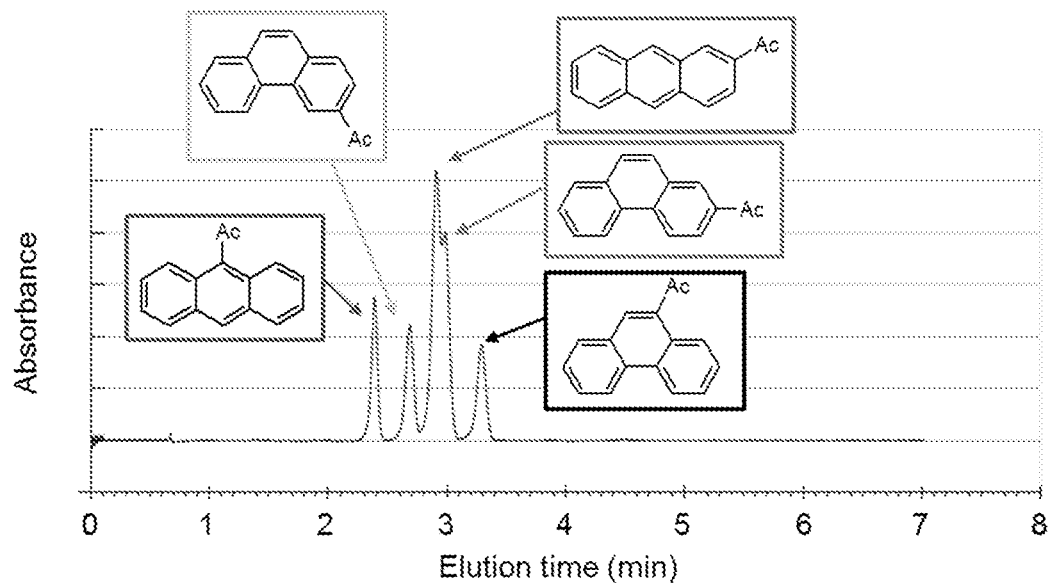
FIG. 1 shows the separation of acetylanthracene isomers and acetylphenanthrene isomers by SFC using a poly(4-vinylpyridine)-bonded silica gel as the stationary phase.

The stationary phase for supercritical liquid chromatography of the invention includes a support to which is chemically bonded a polymer having a nitrogen-containing aromatic ring on repeating units of the main chain.

As used herein, "stationary phase" refers to a material which, in chromatography, is immobilized at the interior of an analytical instrument (a column or capillary) and brings about, between itself and a fluid that moves while remaining in touch with the material, the partitioning and separation of substances to be separated. When the material is in the form of particles, "stationary phase" may denote the bulk material formed by the packing of these particles or may denote the individual particles.

Here, "nitrogen-containing aromatic ring" refers to a heterocyclic aromatic ring in which the aromatic ring is formed of carbon atoms and nitrogen atoms. Preferred examples include those selected from among pyridyl groups, imidazole groups, carbazole groups and pyrazyl groups.

In the stationary phase of the invention, from the standpoint of safety and separation performance, chemical bonds have been formed between the support and the polymer. Exemplary production methods include those described below.

Although it is possible, in a stationary phase for supercritical fluid chromatography, to utilize physical bonds with the support to coat a polymer thereon, the polymer in such cases may leach out depending on the solvent, and so this is not a desirable method.

(1) A production method that include a step of radical copolymerizing a vinyl monomer having a nitrogen-containing aromatic ring or an isopropenyl monomer having a nitrogen-containing aromatic ring with a support having a polymerizable functional group bonded thereto.

(2) A production method that includes: a step of obtaining a polymer by radical polymerizing a vinyl monomer having a nitrogen-containing aromatic ring or an isopropenyl monomer having a nitrogen-containing aromatic ring in the presence of a chain transfer agent having on an end thereof a crosslinkable silyl group; and a step of silane coupling the resulting polymer on a support surface.

(3) A production method that includes a step of introducing a polymer having nitrogen-containing aromatic rings on repeating units of the main chain onto a support surface by introducing covalent bonds that become dormant species onto the support surface and using a vinyl monomer having a nitrogen-containing aromatic ring or an isopropenyl monomer having a nitrogen-containing aromatic ring to carry out living radical polymerization from the support surface.

(4) A production method that includes: a step of copolymerizing a silane coupling agent having a polymerizable double bond with a vinyl monomer having a nitrogen-containing aromatic ring or an isopropenyl monomer having a nitrogen-containing aromatic ring; and silane coupling the resulting polymer at the support surface.

(5) A production method that includes the step of introducing chain transferable functional groups onto a support surface, and radical polymerizing a vinyl monomer having a nitrogen-containing aromatic ring or an isopropenyl monomer having a nitrogen-containing aromatic ring.

(6) A production method that includes the steps of: obtaining a polymer by the anionic polymerization of an anionic initiator having a crosslinkable silyl group on a starting end with a vinyl monomer having a nitrogen-containing aromatic ring or an isopropenyl monomer having a nitrogen-containing aromatic ring; and a step of silane coupling the resulting polymer on a support surface.

(7) A production method that includes: a step of anionic polymerizing an anionic initiator with a vinyl monomer having a nitrogen-containing aromatic ring or an isopropenyl monomer having a nitrogen-containing aromatic ring and terminating the polymerization by acting a silane coupling agent-containing terminator; and a step of silane coupling the resulting polymer on a support surface.

(8) A production method that includes a step of mixing a composition that includes a vinyl polymer having a nitrogen-containing aromatic ring or an isopropenyl monomer having a nitrogen-containing aromatic ring, a crosslinking agent and an initiator together with a support and carrying out a crosslinking reaction.

In all of these methods, it is possible to regulate the stereoregularity of the polymer that forms by means of, for example, the polymerization temperature, polymerization solvents, additives and the like at the time of polymerization.

Production Method (1) is described.

The support to which are bonded a polymerizable functional group that can be used in method (1) for producing the stationary phase of the invention can be obtained by the following method.

The polymerizable functional group bonded to the support is exemplified by a radical polymerizable functional group. Illustrative examples include a vinyl group, an allyl group, an isopropenyl group and an alkenyl group of 4 to 12 carbon atoms having a double bond at the ω position. Of these, vinyl groups, allyl groups and isopropenyl groups are preferred.

The support is exemplified by porous organic supports and porous inorganic supports, with the use of a porous inorganic support being preferred. Suitable porous organic supports include polymer substances selected from polystyrenes, poly(meth)acrylamides and poly(meth)acrylates. Suitable porous inorganic supports include silica gel, alumina, zirconia, titania, magnesia, glass, kaolin, titanium oxide, silicate and hydroxyapatite. Preferred supports are silica gel, alumina and glass.

When silica gel is used as the support, the polymerizable functional group is chemically bonded to the support via silanol groups on the silica gel.

When a support other than silica gel is used, by carrying out surface treatment of the support, excess adsorption to the support itself of the substances to be separated can be suppressed. Further, polymerizable functional group via the groups introduced in the surface treatment can be induced to the support. Examples of surface treatment agents include silane coupling agents such as aminopropylsilane and titanate or aluminate-type coupling agents.

When silica gel is used as the support, this can be one that is typically referred to as "core-shell" or "peripheral," in which only the surface layer has been made porous.

The support to which such polymerizable functional group is bonded is obtained by, for example, silane coupling a compound of formula (I) below with a support, preferably silica gel.

[C3]

$$W\!-\!X\!-\!Y\!-\!SiR_{3-n}Z_n \qquad (I)$$

(In formula (I), W is a vinyl group, an allyl group, an isopropenyl group or an alkenyl group of 4 to 12 carbon atoms having a double bond at the ω position; X is an amide group, an ester group, an N-alkylamide group of 1 to 3 carbon atoms, an ether group, a sulfoxide group, a sulfone group, a sulfide group or a phosphoric acid ester group; Y is an alkylene group of 1 to 30 carbon atoms; each R is independently an alkyl group of 1 to 3 carbon atoms; Z is a leaving group that can form a bond between the silicon atom in formula (I) and the support; and n is an integer from 1 to 3.)

In formula (I), W is preferably a vinyl, allyl or isopropenyl group.

In formula (I), X is part of the linker between W and the terminal Z group, and is preferably an amide group, an N-alkylamide group of 1 to 3 carbon atoms, or an ester group.

Y in formula (I) is preferably an alkylene of 1 to 5 carbon atoms, and is more preferably a methylene group, an ethylene group or a trimethylene group.

R in formula (I) is preferably a methyl group or an ethyl group.

Z in formula (I) is a leaving group, and can be any atomic group that can form a bond between the silicon atom in formula (I) and a constituent atom such as oxygen of the support. For a good balance between ease of handling and reactivity, an alkoxy group of 1 to 5 carbons can generally be used, with the use of a methoxy group or an ethoxy group being especially preferred. Illustrative examples include halogens (chlorine, bromine or iodine), alkylmercaptyl groups of 1 to 20 carbon atoms, nitrogen-containing groups such as dimethylamino, diethylamino, pyrrolidino and imidazolyl groups, and the allyl and 2-methyl-2-propenyl groups. The reaction conditions (including catalyst addition) can be adjusted according to the type of leaving group.

The compound of formula (I) above can be obtained by reacting a compound having the structure represented by W in formula (I) with a compound having the —Y—SiR$_{3-n}$Z$_n$ structure in formula (I).

The "—X—" moiety in formula (I) is formed by a reaction between these compounds.

The compound having the structure represented by W is exemplified by acrylic acid in which the hydrogen on the carbon bonded to the vinyl group can be substituted with an alkyl group of 1 to 12 carbon atoms, or a halide of an acrylic acid in which the hydrogen on the carbon bonded to the vinyl group can be substituted with an alkyl group of 1 to 12 carbon atoms.

The compound having the —Y—SiR$_{3-n}$Z$_n$ structure in formula (I) is exemplified by silane coupling agents having a group that is the precursor of the above-described X moiety and having an alkoxy group of 1 to 5 carbon atoms as a leaving group.

The support to which is bonded a polymerizable functional group that is used in the invention is preferably a surface-modified silica gel obtained by silane coupling the compound of formula (I) with silica gel.

When the stationary phase of the invention is produced by Production Method (1) described above, it can be obtained by copolymerizing a vinyl monomer having a nitrogen-containing aromatic ring or an isopropenyl monomer having a nitrogen-containing aromatic ring with a support to which is bonded a polymerizable functional group.

Such copolymerization may involve, for example, inducing copolymerization for both the vinyl groups on the vinyl monomer having a nitrogen-containing aromatic ring or the isopropenyl groups on the isopropenyl monomer having a nitrogen-containing aromatic ring and the polymerizable functional group. A known method can be used for the reaction conditions at that time.

Examples of vinyl monomers having a nitrogen-containing aromatic ring include vinylpyridines, vinylimidazoles, vinylcarbazoles and vinylpyrazines.

Examples of vinylpyridines include 2-vinylpyridine, 3-vinylpyridine and 4-vinylpyridine.

An example of a vinylimidazole is 1-vinylimidazole. An example of a vinylcarbazole is 9-vinylcarbazole.

An example of a vinylpyrazine is 2-vinylpyrazine.

Examples of isopropenyl monomers having a nitrogen-containing aromatic ring include isopropenylpyridine, isopropenylimidazole, isopropenylcarbazole and isopropenylpyrazine.

Examples of isopropenylpyridines include 2-isopropenylpyridine, 3-isopropenylpyridine and 4-isopropenylpyridine.

An example of an isopropenylimidazole is 1-isopropenylimidazole.

An example of an isopropenylcarbazole is 9-isopropenylcarbazole.

An example of an isopropenylpyrazine is 2-isopropenylpyrazine.

In all the above vinyl monomers and isopropenyl monomers having a nitrogen-containing aromatic ring, the hydrogen atoms on the heterocycle may have substituents different from the polymer main chain. Examples of such substituents include alkyl groups of 1 to 12 carbon atoms, alkoxy groups of 1 to 12 carbon atoms, cyano groups, halogen atoms, hydroxyl groups, amino groups and nitro groups. Of these, substitution with methyl groups or halogen atoms (fluorine, chlorine, bromine, iodine) is preferred because direct interactions between the substituents themselves are limited and such substitution influences molecular recognition by the polymer.

The stationary phase of the invention obtained using the above-described starting materials and production method presumably has the following structure.

[C4]

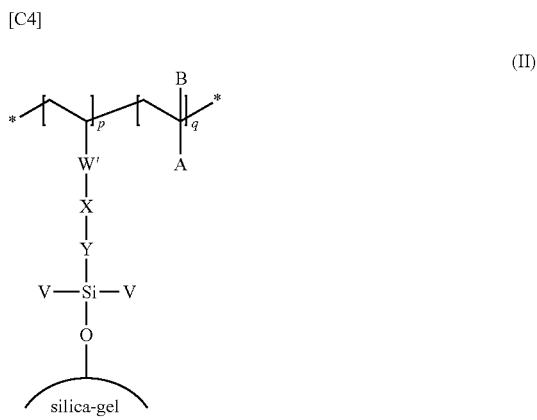

(II)

(In formula II, W', which is derived from W in formula (I), is a group formed by addition polymerization; X is an amide group, an ester group, an N-alkylamide group of 1 to 3 carbon atoms, an ether group, a sulfoxide group, a sulfone group, a sulfide group or a phosphoric acid ester group; Y is an alkylene group of 1 to 30 carbon atoms; A is a group having a nitrogen-containing aromatic ring; B is a hydrogen atom, a methyl group or an ethyl group; and V is an ether group bonded to the silica gel surface, an unreacted Z group shown in formula (I), or an R group.)

In formula (II), illustrative examples of W' include a single bond and alkylene groups of 1 to 10 carbon atoms which may have a branched chain. Preferred examples of W' include a single bond, a methylene group, an ethylene group and a trimethylene group.

Preferred groups for X and Y in formula (II) can be the same as for formula (I) above.

A in formula (II) is a group having a nitrogen-containing aromatic ring, preferably one selected from among pyridyl, imidazole, carbazole and pyrazyl groups. Of these, 2-pyridyl, 3-pyridyl, 4-pyridyl, 1-imidazole, 9-carbazole and 2-pyrazyl groups are preferred.

B in formula (II) is preferably a hydrogen atom or a methyl group.

In formula (II), p can be from 1 to 10, and q can be from about 10 to about 300. Here, p is preferably from 1 to 5; q is preferably from 15 to 250, and more preferably from 20 to 200.

With regard to V in formula (II), when n=1 in the compound of formula (I) above, V=R; when n=2, the ratio of unreacted Z groups or R groups to the total number of V is from 50% to 100%; when n=3, the ratio of unreacted Z groups or R groups to the total number of V is from 0% to 100%.

Next, Production Method (2) for obtaining the stationary phase of the invention is described.

Production Method (2) includes the steps of: radical polymerization in the presence of a chain transfer agent having a terminal crosslinkable silyl group; and silane coupling the resulting polymer on a support surface.

The chain transfer agent having a terminal crosslinkable silyl group that is used in Production Method (2) is exemplified by compounds of formula (III) below. In this invention, "crosslinkable silyl group" refers to a silyl group to which is bonded a leaving group such as that indicated by Z in formula (III) below. The same applies also to the compound used in the other production methods below.

[C5]

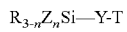

$$R_{3-n}Z_nSi-Y-T \qquad (III)$$

(In formula (III), each R is independently an alkyl group of 1 to 5 carbon atoms; Z is a leaving group that can form a bond between the silicon atom in formula (III) and the support; Y is an alkylene group of 1 to 30 carbon atoms; T is a chain-transferring functional group; and n is an integer from 1 to 3.)

In formula (III), R is preferably a methyl group, an ethyl group or a propyl group. Z is a leaving group, and can be any atomic group that can form a bond between the silicon atom in formula (III) and a constituent oxygen in the silica gel.

For a good balance between ease of handling and reactivity, alkoxy groups of 1 to 5 carbon atoms can generally be used as the leaving group; illustrative examples include methoxy and ethoxy groups. Use can also be made of halogens (chlorine, bromine or iodine), nitrogen-containing groups such as dimethylamino, diethylamino, pyrrolidino and imidazolyl groups, and allyl and isopropenyl groups. The reaction conditions (including catalyst addition) can be adjusted according to the type of leaving group. Y is more preferably an alkylene group of 1 to 10 carbon atoms. T is a chain transferring functional group. "Chain transferring functional group" refers to a functional group where, in a polymerization reaction, there vigorously arises a chain transfer reaction accompanied by transfer of a growing active species and a re-initiation reaction. The presence of a chain transferring functional group means that it is possible to some extent to control the molecular weight and terminal structure of the obtained polymer. Preferred examples of chain transferring functional groups include halogenated alkyl groups of 1 to 12 carbon atoms, alkyl group of 1 to 12 carbon atoms having a thiol at the end, and alkyl groups of 1 to 12 carbon atoms having therein a disulfide group.

Examples of the halogen on the halogenated alkyl groups of 1 to 12 carbon atoms include chlorine, bromine and iodine. These alkyl groups are exemplified by alkyl groups of 1 to 3 carbon atoms.

By carrying out radical polymerization on a vinyl monomer having a nitrogen-containing aromatic ring or an isopropenyl monomer having a nitrogen-containing aromatic ring in the presence of such a chain transfer agent and using a small amount of a radical generator as a catalyst, a compound having the structure shown in formula (IV) below can be obtained. It is possible at this time to control the molecular weight to some degree using the molar ratio between the chain transfer agent and the monomer. The radical generator can be a known radical generator that is used in polymerization reactions; examples include azo compounds and peroxides.

[C6]

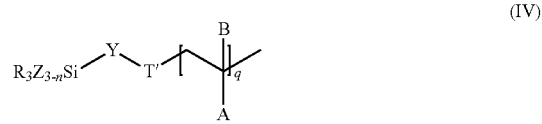

(IV)

(In formula IV, T' is derived from T in formula III and is a group that forms by a chain transfer reaction. A is a group having a nitrogen-containing aromatic ring; B is a hydrogen atom or a methyl or ethyl group; and q is an integer from 2 to 300.)

Preferred examples of A in formula (IV) include pyridyl, imidazole, carbazole and pyrazyl groups, with 2-pyridyl, 3-pyridyl, 4-pyridyl, 1-imidazole and 9-carbazole and 2-pyrazyl groups being more preferred. B is preferably a hydrogen atom or a methyl group.

When T is an alkyl group of 1 to 12 carbon atoms having a halogen bonded at the end, T' in formula (IV) is an alkylene residue of 1 to 12 carbon atoms which is substituted with that halogen. When T is an alkyl group of 1 to 12 carbon atoms having a thiol at the end or an alkyl group of 1 to 12 carbon atoms having a disulfide group therein, T' is a thioether.

The support used in Production Method (2) for the stationary phase of the invention can be the same as the support used in Production Method (1).

A known silane coupling method can be used as the method for bonding the compound of formula (III) to the support by a silane coupling reaction.

Next, Production Method (3) is described.

A polymer having nitrogen-containing aromatic rings on repeating units of the main chain can be introduced onto the surface of a support such as silica gel by introducing stable covalent bonds that become dormant species onto the support surface and carrying out living radical polymerization from the surface.

Using this technique, a polymer having a high density of nitrogen-containing aromatic rings on repeating units of the main chain can be introduced onto the surface of a support such as silica gel, making it possible to obtain a brush-type polymer that can be oriented to a high degree.

Concerning the above-mentioned introduction of stable covalent bonds that become dormant species and living radical polymerization, commonly used examples are shown below in (i) to (iii).

(i) Carbon-halogen bonds that can be activated with a transition metal catalyst such as copper, iron or ruthenium are introduced onto the surface of a support such as silica gel and living polymerization of a vinyl monomer having a nitrogen-containing aromatic ring is made to proceed by reversibly carrying out the abstraction and return of halogens by a one-electron redox mechanism. By using this technique, it is possible to introduce onto the surface of a support such as silica gel a polymer having a high density of nitrogen-containing aromatic rings on repeating units of the main chain.

(ii) When an alkoxyamine, for example, is introduced onto the surface of a support such as silica gel and a carbon-oxygen bond on the alkoxyamine is thermally dissociated to form a carbon radical and nitroxide, the polymerization of a vinyl monomer having a nitrogen-containing aromatic ring proceeds, along with which the grown carbon radical is quickly and reversibly capped by the nitroxide, reverting once again to a dormant species and controlling the polymerization reaction. By using this technique, it is possible to introduce onto the surface of a support such as silica gel a polymer having a high density of nitrogen-containing aromatic rings on repeating units of the main chain.

(iii) When a thiocarbonyl compound and an iodine compound are introduced onto the surface of a support such as silica gel, reversible chain transfer rapidly arises between polymer ends owing to transfer reactions between radical species and dormant species, thus providing an opportunity for all the polymer chains to grow in the same way and making control of the molecular weight possible. Using this technique, it is possible to introduce, onto the surface of a support such as silica gel in a high density, a polymer having a nitrogen-containing aromatic ring on repeating units of the main chain.

In each of (i) to (iii) above, in addition to silica gel, it is possible to use as the support the same materials as can be used in above Production Methods (1) and (2). The vinyl monomer having a nitrogen-containing aromatic ring can also be the same as those used in Production Methods (1) and (2).

Next, Production Method (4) is described.

This production method includes the steps of: copolymerizing a silane coupling agent having a polymerizable double bond with a vinyl monomer having a nitrogen-containing aromatic ring or an isopropenyl monomer having a nitrogen-containing aromatic ring; and silane coupling the resulting polymer at the support surface.

The silane coupling agent having a polymerizable double bond is exemplified by compounds of the structure represented by formula (V) below.

[C7]

$$W\text{—}X\text{—}Y\text{—}SiR_{3-n}Z_n \qquad (V)$$

(In formula (V), W is a vinyl group, an allyl group, an isopropenyl group or an alkenyl group of 4 to 12 carbon atoms which has a double bond at the ω position; X is an amide group, an ester group, an N-alkylamide group of 1 to 3 carbon atoms, an ether group, a sulfoxide group, a sulfone group or a phosphoric acid ester group; each R is independently an alkyl group of 1 to 5 carbon atoms; Z is a leaving group that can form a bond between the silicon atom of formula (V) and the support; Y is an alkylene group of 1 to 30 carbon atoms; and n is an integer from 1 to 3.)

Y in formula (V) is preferably an alkylene group of 1 to 5 carbon atoms, and more preferably a methylene, ethylene or trimethylene group.

R is preferably a methyl or ethyl group.

Z is a leaving group, and can be any atomic group that can form a bond between the silicon atom in formula (V) and, in cases where the support is, for example, silica gel, a constituent oxygen in the silica gel. Even in cases where the support is not silica gel, the leaving group is capable of forming a bond with a constituent atom of the support.

For a good balance between ease of handling and reactivity, atomic groups that are commonly used as leaving groups include alkoxy groups of 1 to 5 carbon atoms, preferred examples of which include methoxy and ethoxy groups. Use can also be made of halogens (chlorine, bromine or iodine), nitrogen-containing groups such as dimethylamino, diethylamino, pyrrolidino and imidazolyl groups, and allyl and isopropenyl groups. The reaction conditions (including catalyst addition) can be adjusted according to the type of leaving group.

In Production Method (4) as well, in addition to silica gel, it is possible to use as the support the same materials as those used in above Production Methods (1) and (2). The vinyl monomer or isopropenyl monomer having a nitrogen-containing aromatic ring too can be the same as those used in Production Methods (1) and (2).

In this production method, regulation of the molecular weight is possible by using a suitable chain transfer agent and the above-described living radical polymerization process when synthesizing the polymer. A known silane coupling method can be used as the method for bonding the resulting polymer with the support by a silane coupling reaction.

Next, Production Method (5) is described.

This production method includes the step of introducing chain transferable functional groups onto a support surface, and radical polymerizing a vinyl monomer having a nitrogen-containing aromatic ring or an isopropenyl monomer having a nitrogen-containing aromatic ring.

The support to which chain transferable functional groups like those described above are bonded can be obtained by silane coupling, for example, a compound of formula (VI) below with silica gel (in cases where silica gel is used as the support).

[C8]

$$T\text{—}Y\text{—}SiR_{3-n}Z_n \qquad (VI)$$

(In formula (VI), T is a chain transferring functional group; Y is an alkylene group of 1 to 30 carbon atoms; each R is independently an alkyl group of 1 to 5 carbon atoms; Z is a leaving group that can form a bond between the silicon atom in formula (V) and the support; and n is an integer from 1 to 3.)

In formula (VI), R is preferably a methyl, ethyl or propyl group. Z is a leaving group, and can be any atomic group that can form a bond between the silicon atom in formula (VI) and, when the support is silica gel, a constituent oxygen of the silica gel. Even in cases where the support is not silica gel, the leaving group is capable of forming a bond with a constituent atom of the support.

T is the same as in Production Method (2), and R and Z are preferably the same as those used in Production Methods (1), (2) and (4).

The support to which are bonded chain transferring functional groups that is used in this invention is preferably a surface-modified silica gel obtained by silane coupling between the compound of formula (VI) above and silica gel.

By carrying out the radical polymerization of a vinyl monomer having a nitrogen-containing aromatic ring in the presence of a support onto the surface of which chain transferring functional groups have been introduced (chemically bonded) and using a small amount of a radical generator as a catalyst, it is possible to immobilize a polymer on the support surface. The same vinyl monomer having a nitrogen-containing aromatic ring can be used as in Production Methods (1) and (2). In Production Method (5) as well, in addition to silica gel, it is possible to use as the support the same materials as those used in Production Methods (1) and (2), and the vinyl monomer and isopropenyl monomer having a nitrogen-containing aromatic ring can be the same as those used in Production Examples (1) and (2). In addition, the radical generator used can be the same as that used in Production Example (2).

Next, Production Method (6) is described.

This production method includes the steps of: obtaining a polymer by the anionic polymerization of an anionic initiator having a crosslinkable silyl group on a starting end with a vinyl monomer having a nitrogen-containing aromatic ring or an isopropenyl monomer having a nitrogen-containing aromatic ring; and silane coupling the resulting polymer on a support surface. Quantitative ratio of the anionic initiator and the polymerizable monomer can be determined properly.

The anionic initiator having a crosslinkable silyl group at the starting end can be obtained by silane coupling between, for example, a compound of formula (VII) below and, when silica gel is used as the support, the silica gel.
[C9]

$$R_{3-n}Z_nSi—Y-M \qquad (VII)$$

(In formula (VII), each R is independently an alkyl group of 1 to 5 carbon atoms; Z is a leaving group that can form a bond between the silicon atom in formula (VII) and the support; Y is a branched or linear alkylene group of 1 to 30 carbon atoms in which any hydrogen can be substituted with a group having an aromatic ring; M is an alkali metal or an alkaline earth metal; and n is an integer from 1 to 3.)

In formula (VII), R is preferably a methyl, ethyl or propyl group; preferred examples of Y and Z are the same as in formula (I) above; and M is preferably lithium, sodium, potassium or magnesium.

As for Y, the group having an aromatic ring that can be substituted for any hydrogen is exemplified by alkyl groups of 4 to 20 carbon atoms which have one or two phenyl groups. A more specific example is the 1,1-diphenylhexyl group.

A polymer having a terminal crosslinkable silyl group and having nitrogen-containing aromatic rings on repeating units of the main chain can be synthesized by a known method in the presence of such an anionic initiator. The vinyl monomer and isopropenyl monomer having a nitrogen-containing aromatic ring can be the same as those used in Production Methods (1) and (2). However, in cases where introducing a silane coupling agent directly onto the starting end is difficult on account of side-reactions during polymerization, it is possible instead to obtain the stationary phase by synthesizing a derivative in which the starting end is protected with a protecting group, carrying out de-protection following polymerization, and quantitatively converting to a silane coupling agent. Known silane coupling methods can be used as the method for bonding the resulting polymer with the support by a silane coupling reaction.

Next, method (7) is described.

This production method includes the steps of: obtaining a polymer by anionic polymerizing an anionic initiator with a vinyl monomer having a nitrogen-containing aromatic ring or an isopropenyl monomer having a nitrogen-containing aromatic ring and then having a crosslinkable silyl group-containing terminator act thereon; and silane coupling the resulting polymer on a support surface. In cases where it is difficult to introduce the silane coupling agent directly onto the stopping end, it is possible instead to obtain the stationary phase by using a derivative protected with a protecting group, carrying out de-protection following the termination of polymerization, and quantitatively converting to a silane coupling agent.

A known method can be used for polymerization using an anionic initiator. The vinyl monomer and isopropenyl monomer having a nitrogen-containing aromatic ring can be the same as those used in Production Methods (1) and (2). The quantitative ratio of anionic initiator and monomer can be suitably set. The terminator having a crosslinkable silyl group is exemplified by compounds of formula (VIII) below. The amount of terminator having a crosslinkable silyl group can be set as appropriate.
[C10]

$$R_{3-n}Z_nSi—Y—Z' \qquad (VIII)$$

(In formula (VIII), each R is independently an alkyl group of 1 to 5 carbon atoms; Z is leaving group that can form a bond between the silicon atom in formula (VIII) and the support; Y is a branched or linear alkylene group of 1 to 30 carbon atoms in which any hydrogen can be substituted with a group containing an aromatic ring; Z' is a group that is eliminated in the reaction between a long-chain anion end and the terminator; and n is an integer from 1 to 3.)

Preferred examples of Z include the examples mentioned for formula (I) above.

Specific examples of Z' include halogens (chlorine, bromine or iodine), alkoxy groups of 1 to 5 carbon atoms, especially methoxy and ethoxy groups, nitrogen-containing groups such as alkylmercaptyl, dimethylamino, diethylamino, pyrrolidino and imidazolyl groups, and allyl and 2-methyl-2-propenyl groups. The reaction conditions (including catalyst addition) can be adjusting according to the type of leaving group.

With regard to Y, examples of the group having an aromatic ring that can be substituted for any hydrogen include alkyl groups of 4 to 20 carbon atoms having one or two phenyl groups. A more specific example is the 1,1-diphenylhexyl group.

Known silane coupling methods can be used as the method for bonding together the polymer thus obtained and the support by way of a silane coupling reaction.

Next, Production Method (8) is described.

This production method includes the step of mixing a composition that includes a vinyl monomer having a nitrogen-containing aromatic ring or an isopropenyl monomer having a nitrogen-containing aromatic ring, a crosslinking agent and an initiator together with a support and carrying out a crosslinking reaction.

In this production method, an insoluble polymer is obtained by copolymerizing the monomer with a crosslinking agent. Specifically, a mixture of a vinyl monomer having a nitrogen-containing ring or an isopropenyl monomer having a nitrogen-containing ring, from 0.01 to 1 equivalent, based on the monomer, of divinyl benzene, methylenebisacrylamide, ethylene glycol dimethacrylate or the like as the crosslinking agent, a suitable amount of radical initiator and, optionally, a solvent can be absorbed onto the support, and the initiator can be placed under polymerization-initiating conditions.

The radical initiator can be a known initiator used in ordinary radical polymerization reactions. Examples include azo compounds and peroxides.

Stationary phases obtained by any of above methods (1) to (8) have excellent performances as stationary phases for supercritical fluid chromatography.

The polymer which is bonded to the support of the inventive stationary phase and has nitrogen-containing rings on repeating units of the main chain has a weight-average molecular weight of preferably from 1,000 to 5,000,000. As used herein, "weight-average molecular weight" refers to the —(CH$_2$—CAB)$_n$— sites which, in the case of structures represented by, e.g., above formula (II) or (IV), are the repeating units of the main chain.

From such standpoints as the solubility of the polymer in solvent, preventing particle agglomeration when supporting the polymer on the support, suppressing dissolution in the mobile phase solvent, and maintaining the bonded amount of polymer when chemically bonded to the support, the weight-average molecular weight is preferably in the above range. The optimum point differs depending on the type of polymer.

However, in method (1) for producing the stationary phase of the invention, because polymerization of the vinyl monomer having a nitrogen-containing aromatic ring and immobilization on the silica gel occur at the same time, the weight-average molecular weight is estimated from the polymerization solution supernatant.

In Production Methods (2), (4), (6) and (7), before bonding the polymer having nitrogen-containing aromatic rings on repeating units of the main chain to the substrate, the weight-average molecular weight of the polymer is measured.

The weight-average molecular weight can be measured by gel permeation chromatography (GPC) using polystyrene as the reference substance.

In the stationary phase of the invention, because the polymer having nitrogen-containing aromatic rings on repeating units of the main chain is covalently bonded to the support surface, even when a solvent inherently capable of dissolving the polymer, or a mixed solvent containing the same, is used as the developing solvent, the polymer does not dissolve and so there is not loss in function as a stationary phase.

Because the specific surface area of the stationary phase of the invention corresponds to the specific surface area of the support used, a support having the desired specific surface area should be selected. When the support is, for example, silica gel, adjustment is possible by selecting a suitable commercial product. Generally, in cases where the polymer is supported on a support, a change in specific surface area greater than that attributable to error does not occur before and after the polymer is supported; hence, the specific surface area of the stationary phase can be regarded as identical to the specific surface area of the support used.

The average particle size of such supports that can be used in the invention is typically from 0.1 to 1,000 μm, and preferably from 1 to 50 μm. The average pore size is typically from 10 to 10,000 Å, preferably from 50 to 1,000 Å, and more preferably from 100 to 1,000 Å.

The specific surface area of the support is typically from 5 to 1,000 $m^2/g$, and preferably from 10 to 500 $m^2/g$. Generally, in cases where the polymer is supported on a support, a change in specific surface area greater than that attributable to error does not occur before and after the polymer is supported; hence, the average particle size of the stationary phase can be regarded as identical to the average particle size of the support used. That is, in cases where the stationary phase of the invention is particulate, the average particle size can be from 0.1 μm to 1,000 μm, and is preferably from 1 to 50 μm.

The polymer supported on the support has an average thickness (supported amount per gram of support/specific surface area of support) that typically is preferably from 0.5 to 5 nm. In this range, the peaks have a tendency to be sharp, which is good.

Thus, in a stationary phase having a polymer supported on a support, the ratio (%) in parts by mass of polymer included per 100 parts by mass of the stationary phase is preferably from 1 to 50 mass %, more preferably from 3 to 30 mass %, and even more preferably from 5 to 30 mass %. This ratio is desirable because excessively strong retention and broadening of the peak can be avoided while yet enabling the adsorptive ability of the polymer to be suitably manifested.

The ratio (%) of the parts by mass of polymer included per 100 parts by mass of the stationary phase can be measured by elemental analysis. The parts by mass ratio of polymer within the stationary phase is calculated based on measured results for the carbon content of the support prior to bonding of the polymer and the carbon content of the resulting stationary phase, and under the assumption that all carbon aside from that included in the support prior to bonding of the polymer is from the polymer.

In cases where the stationary phase of the invention is particulate, the average particle size indicates the diameter when the particles are spherical, and indicates the diameter of a sphere of equivalent particle volume when the particles are of irregular shape. The average particle size can be measured with an apparatus that carries out measurement using microscopic images, such as the Mastersizer 2000E from Malvern Instruments Ltd.

In cases where the stationary phase of the invention is used as particles, the particles are preferably spherical particles having an aspect ratio of 2 or less, and preferably 1.5 or less. Particles that are closer to being truly spherical are more desirable, and so the aspect ratio has no particular lower limit down to 1.

The aspect ratio is measured as follows. The sample is placed on an observation stage in a randomly scattered state and examined from directly above with an electron microscope or an optical microscope. In a random image in which ten or more independent primary particles (that is, primary particles not touching or overlapping with any other particles) are observed, the major axis and minor axis (length of longest portion perpendicular to major axis) of each independent primary particle in the image are determined, and the ratio of the two is treated as the aspect ratio for the individual particles. The arithmetic mean of the aspect ratios for all the independent primary particles in the image is treated as the aspect ratio in the invention. Here, "primary particles" refers to particles for which the interfaces between particles are clearly observable. Observation is generally carried out after suitable dispersion on a sample stage so as to avoid overlapping by the primary particles. However, incidental overlap can be difficult to avoid and bulk particles formed by the agglomeration of a plurality of primary particles can be present. These instances are excluded from observation.

The stationary phase of the invention can be used as a stationary phase for supercritical fluid chromatography (SFC).

When the stationary phase of the invention is used for SFC, it has excellent separation characteristics for acidic compounds and basic compounds. In addition, the separation characteristics for substances that have been difficult to separate by HPLC, such as condensed ring aromatic compounds and aromatic isomers, are also excellent.

The stationary phase of the invention can be packed into columns for supercritical fluid chromatography, such as those described in Japanese Patent Application Publication No. 2006-058147, and used.

In supercritical fluid chromatography, a fluid which includes a supercritical fluid and a solvent is used as the mobile phase. Here, "supercritical fluid chromatography" is a general term for chromatography in which a supercritical fluid serves as the primary mobile phase. The supercritical fluid is a substance in a state at or above a critical pressure and at or above a critical temperature (i.e., a supercritical state). Examples of substances that can be used as supercritical fluids include carbon dioxide, ammonia, sulfur dioxide, hydrogen halides, nitrous oxide, hydrogen sulfide, methane, ethane, propane, butane, ethylene, propylene, halogenated hydrocarbons and water. However, in terms of suitable critical conditions, safety, cost and other considerations, the supercritical fluid refers substantially to carbon dioxide. Nor is it strictly necessary for the fluid to be supercritical, with "supercritical fluid chromatography" also encompassing use in a subcritical state.

The solvent is one, two or more solvents selected from among various known solvents depending on, for example, the types of target substances and the type of supercritical fluid. Examples of the solvent include lower alcohols such as methanol, ethanol and 2-propanol, ketones such as acetone, acetonitrile, ethyl acetate and THF.

The foregoing supercritical fluid chromatography is not particularly limited, so long as it is chromatography that uses as the mobile phase a fluid which includes the above supercritical fluid and the above solvent. This supercritical fluid chromatography that uses the stationary phase of the invention can be for analysis or for fractionation.

Supercritical fluid chromatography for fractionation is not particularly limited, so long as it is supercritical fluid chromatography that includes the step of separately collecting with a fraction collector, according to the target substances separated in the column, the mobile phase after it has passed through the column.

A column of a known size can be used as the column to be packed.

A suitably adjusted flow rate can be used. For example, the flow rate can be from 0.3 to 10 mL/min, and preferably from 1 to 6 mL/min.

The column temperature can be from about 0° C. to about 50° C., and preferably from about 20° C. to about 40° C.

The back pressure can be from about 120 to 180 bar, and preferably from about 130 to 160 bar.

Alternatively, the stationary phase of the invention can be used as a monolith. In cases where the stationary phase of the invention is made a monolith, it can be obtained by reacting either a support that has been molded beforehand into a monolithic form and to which a polymerizable functional group is bonded, or a starting material for the support that is to be molded into a monolithic form and to which a polymerizable functional group is bonded, with a vinyl monomer having a nitrogen-containing aromatic ring or an isopropenyl monomer having a nitrogen-containing aromatic ring.

The stationary phase for supercritical fluid chromatography of the invention has an excellent separation performance for acidic compounds such as phenylpropionic acid-based NSAIDS, basic compounds such as caffeine analogs, and aromatic or polycyclic aromatic hydrocarbons such as triphenylene and terphenyl.

EXAMPLES

The present invention is described more concretely below while referring to examples. However, the invention is not limited to the embodiments in the following examples.

Preparation Example 1

N-Methyl-N-[3-(Trimethoxysilyl)Propyl]2-Propenamide Treatment of Silica Gel

First, the preparation of an acrylamide-containing silane coupling agent by the following procedure was carried out. 4-Pyrrolidinopyridine (17 mg) was added to a flask, and deaeration followed by a nitrogen purge was carried out. To this were added in order the following under a nitrogen atmosphere: 20 mL of toluene, 0.40 mL of N-methylaminopropyltrimethoxysilane, and 0.55 mL of triethylamine. Next, a toluene solution (5 mL) of 0.18 mL of acryloyl chloride was added dropwise over a period of about 5 minutes under a nitrogen atmosphere. The system was heated at 60° C. for 3 hours, thereby synthesizing an N-methyl-N-[3-(trimethoxysilyl)propyl]2-propenamide crude product.

The crude product obtained by the above reaction was filtered, removing the triethylamine hydrochloride by-product, and the filtrate was caught on 2.2 g of silica gel. Before that, the silica gel was vacuum dried at 150° C. for 2 hours and then cooled to room temperature. The crude product was washed with about 10 mL of toluene, after which a toluene solution in which silica gel had been dispersed was heated for 2 hours at 120° C. on an oil bath, driving off 30 mL of toluene in distillation. Following the end of heat treatment, the system was cooled to room temperature, filtered and collected with a glass filter, and then washed with 50 mL of toluene, 30 mL of methanol and 30 mL of acetone. The resulting stationary phase was vacuum dried overnight at 60° C., giving an acrylamide-bonded silica gel (referred to below as "acrylamide-treated silica gel").

The carbon content of the silica gel thus obtained was 2.80 mass %. The specific surface area of the resulting silica gel, as measured by the BET method, was 91 m$^2$/g, and the average particle size was regarded to be 5 µm.

Example 1

An amount of 2.03 g of the acrylamide-treated silica gel obtained in Preparation Example 1 (average particle size, 5 µm; average pore size, 300 Å) was placed in a flask, and deaeration followed by a nitrogen purge was carried out. To this were added, in order: 3.24 mL of N,N-dimethylformamide, 0.2 mL of tetralin and 1.06 mL of 4-vinylpyridine under a nitrogen atmosphere. Last of all, 0.50 mL of an N,N-dimethylformamide solution of azobisisobutyronitrile adjusted to 0.5 M was added and the flask was heated on an oil bath to 60° C. and held at that level for 6 hours. Following the end of copolymerization, the resulting powder was filtered and collected with a glass filter, and then washed three times with 50 mL of methanol. The stationary phase thus obtained was vacuum dried overnight at 60° C.

Given that the carbon content of the resulting silica gel was 10.99 mass % and the carbon content of the starting silica gel was 2.80 mass %, about 11.9 mass % of poly(4-vinylpyridine) was assumed to be bonded. Measurement of the carbon content was carried out by elemental analysis, and calculation was carried out while treating the amount of increase as entirely attributable to poly(4-vinylpyridine). The same applies as well to the examples that follow below.

The resulting poly(4-vinylpyridine)-bonded silica gel had a specific surface area of 91 m$^2$/g and the average particle size was regarded to be 5

This poly(4-vinylpyridine)-bonded silica gel can be assumed to have the following structure.

[C11]

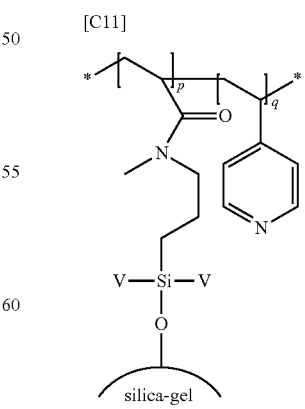

This poly(4-vinylpyridine)-bonded silica gel stationary phase was slurry packed into a 150 mm×4.6 mm ID column, and acetylanthracene and acetylphenanthrene isomers were separated by SFC. FIG. 1 shows the results of SFC with $CO_2$/methanol (97:3, v/v). Chromatography was carried out under the following conditions: flow rate, 4 mL/min; temperature, 40° C.; back pressure, 150 bar. The peaks are, from the left: 9-acetylanthracene, 3-acetylphenanthrene, 2-acetylanthracene, 2-acetylphenanthrene, 9-acetylphenanthrene. Detection was carried out by UV at 254 nm.

The stationary phase of the invention clearly exhibits a good separating ability for substitution regioisomers of closely similar structure. Given that polymers with aromatic rings and dipolar atomic groups thereon arrange themselves regularly to some degree, adsorption sites sensitive to the molecule shapes are thought to have formed.

Figure 2:
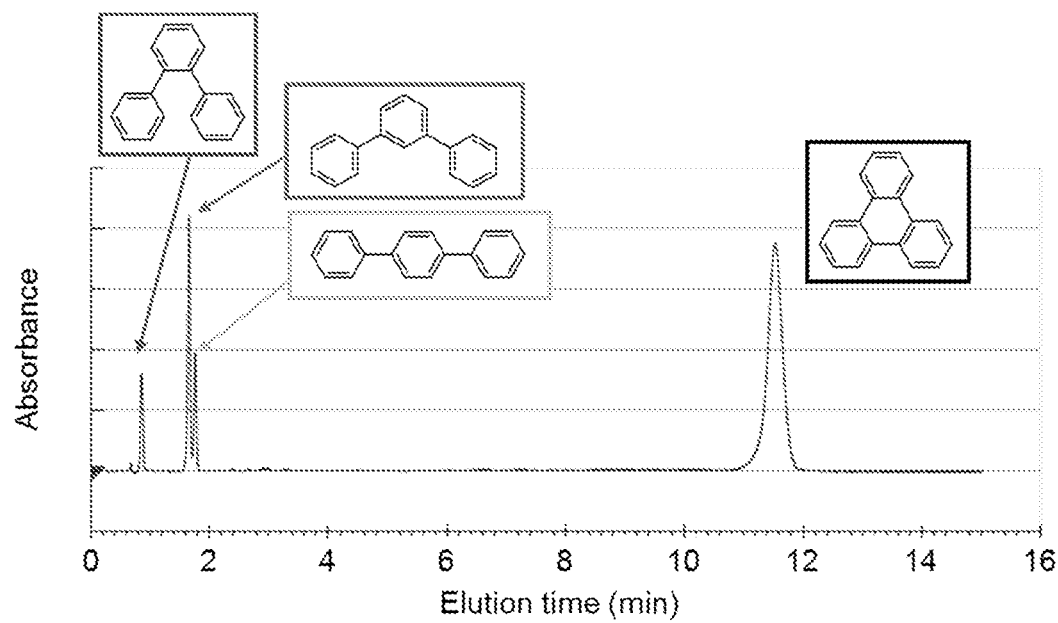
FIG. 2 shows the separation of terphenyl isomers and triphenylene by SFC using a poly(4-vinylpyridine)-bonded silica gel as the stationary phase.

FIG. 2 shows the results of SFC using poly(4-vinylpyridine)-bonded silica gel as the stationary phase. Chromatography was carried out under the following conditions: eluant, $CO_2$/methanol (97:3, v/v); flow rate, 4 mL/min; temperature, 40° C.; back pressure, 150 bar. The peaks are, from the left: o-terphenyl, m-terphenyl, p-terphenyl, triphenylene. Detection was carried out by UV at 254 nm.

Figure 3:
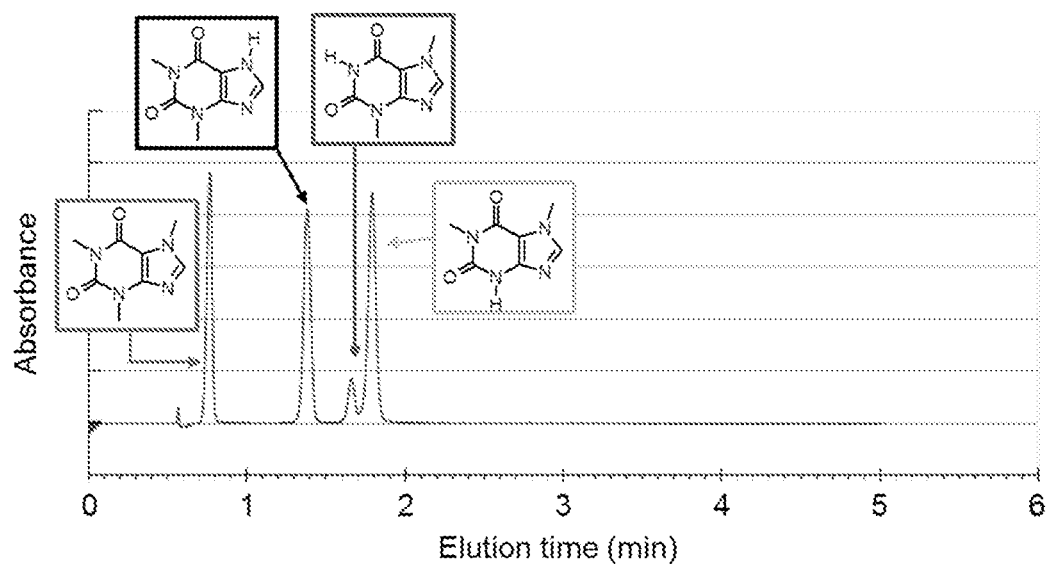
FIG. 3 shows the separation of caffeine, theophylline, theobromine and paraxanthine by SFC using a poly(4-vinylpyridine)-bonded silica gel as the stationary phase.

FIG. 3 shows the results of SFC using poly(4-vinylpyridine)-bonded silica gel as the stationary phase. Chromatography was carried out under the following conditions: eluant, $CO_2$/methanol (90:10, v/v); flow rate, 4 mL/min; temperature, 40° C.; back pressure, 150 bar. The peaks are, from the left: caffeine, theophylline, theobromine, paraxanthine. Detection was carried out by UV at 254 nm.

Figure 4:
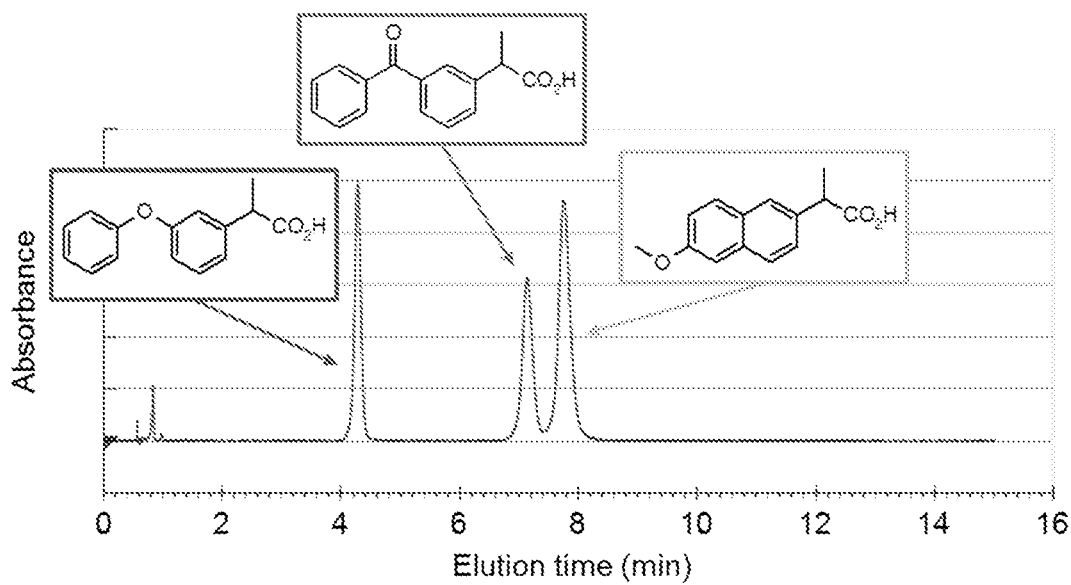
FIG. 4 shows the separation of fenoprofen, ketoprofen and naproxen by SFC using a poly(4-vinylpyridine)-bonded silica gel as the stationary phase.

FIG. 4 shows the results of SFC using poly(4-vinylpyridine)-bonded silica gel as the stationary phase. Chromatography was carried out under the following conditions: eluant, $CO_2$/methanol (90:10, v/v); flow rate, 4 mL/min; temperature, 40° C.; back pressure, 150 bar. The peaks are, from the left: fenoprofen, ketoprofen, naproxen. Detection was carried out by UV at 210 nm.

Figure 5:
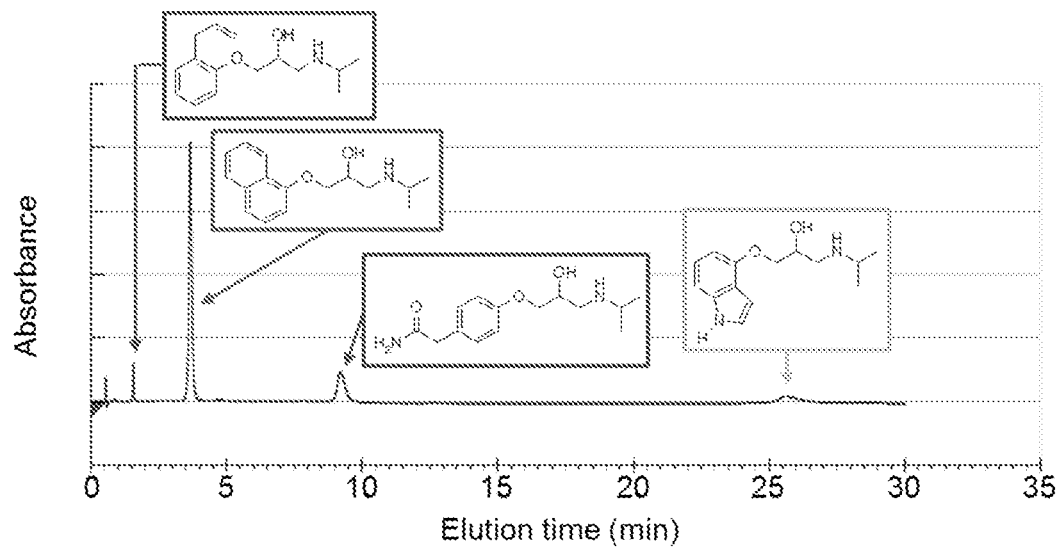
FIG. 5 shows the separation of alprenolol, propranolol, atenolol and pindolol by SFC using a poly(4-vinylpyridine)-bonded silica gel as the stationary phase.

FIG. 5 shows the results of SFC using poly(4-vinylpyridine)-bonded silica gel as the stationary phase. Chromatography was carried out under the following conditions: eluant, $CO_2$/methanol (90:10, v/v); flow rate, 4 mL/min; temperature, 40° C.; back pressure, 150 bar. The peaks are, from the left: alprenolol, propranolol, atenolol, pindolol. Detection was carried out by UV at 230 nm.

Figure 6:
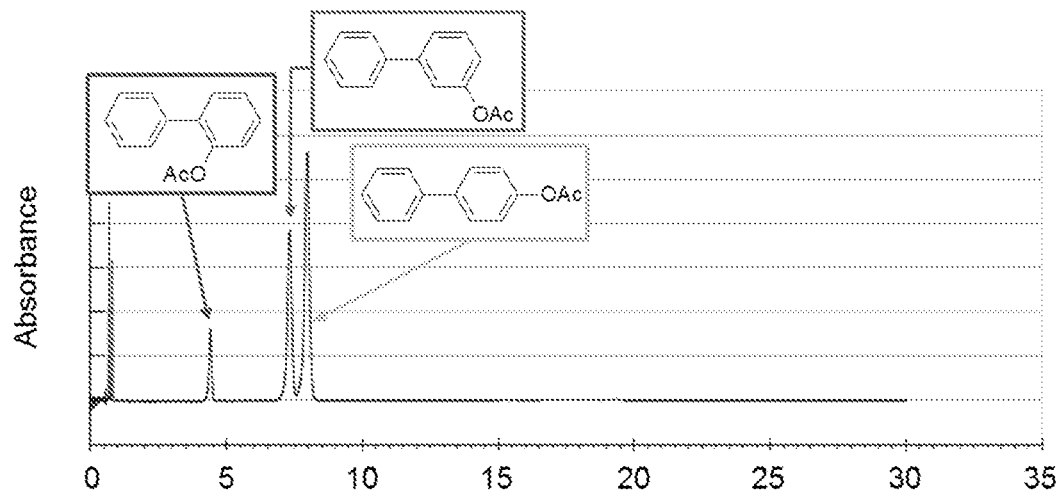
FIG. 6 shows the separation of acetoxybiphenyl isomers by SFC using a poly(4-vinylpyridine)-bonded silica gel as the stationary phase.

FIG. 6 shows the results of SFC using poly(4-vinylpyridine)-bonded silica gel as the stationary phase. Chromatography was carried out under the following conditions: eluant, $CO_2$/methanol (90:10, v/v); flow rate, 4 mL/min; temperature, 40° C.; back pressure, 150 bar. The peaks are, from the left: o-acetoxybiphenyl, m-acetoxybiphenyl, p-acetoxybiphenyl. Detection was carried out by UV at 254 nm.

Figure 7:
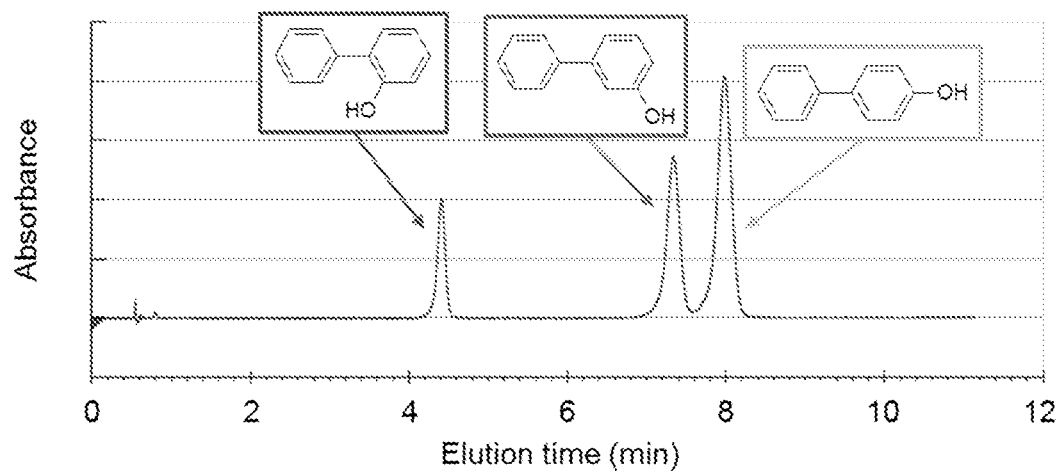
FIG. 7 shows the separation of hydroxybiphenyl isomers by SFC using a poly(4-vinylpyridine)-bonded silica gel as the stationary phase.

FIG. 7 shows the results of SFC using poly(4-vinylpyridine)-bonded silica gel as the stationary phase. Chromatography was carried out under the following conditions: eluant, $CO_2$/methanol (90:10, v/v), flow rate, 4 mL/min; temperature, 40° C.; back pressure, 150 bar. The peaks are, from the left: o-phenylphenol, m-phenylphenol, p-phenylphenol. Detection was carried out by UV at 254 nm.

Example 2

An amount of 2.05 g of acrylamide-treated silica gel obtained by a method similar to that in Preparation Example 1 (average particle size, 5 μm; average pore size, 300 Å) was placed in a flask, and deaeration followed by a nitrogen purge was carried out. To this were added, in order: 1.66 mL of N,N-dimethylformamide, 0.2 mL of tetralin and 2.15 mL of 2-vinylpyridine under a nitrogen atmosphere. Last of all, 1.00 mL of an N,N-dimethylformamide solution of azobisisobutyronitrile adjusted to 0.5 M was added and the flask was heated on an oil bath to 60° C. and held at that level for 6 hours. Following the end of copolymerization, the resulting powder was filtered and collected with a glass filter, and then washed three times with 50 mL of methanol. The stationary phase thus obtained was vacuum dried overnight at 60° C.

Given that the carbon content of the resulting silica gel was 13.19 mass % and the carbon content of the starting silica gel was 2.88 mass %, about 13.2 mass % of poly(2-vinylpyridine) was assumed to be bonded.

The resulting poly(2-vinylpyridine)-bonded silica gel had a specific surface area of 116 $m^2$/g and the average particle size was regarded to be 5

This poly(2-vinylpyridine)-bonded silica gel can be assumed to have the following structure.

[C12]

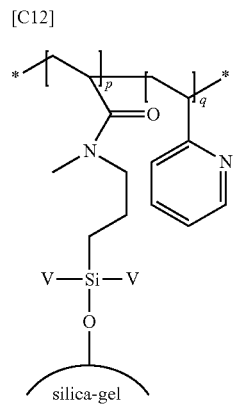

As in Example 1, the resulting poly(2-vinylpyridine)-bonded silica gel stationary phase was slurry packed into a 150 mm×4.6 mm ID column, and evaluated by SFC.

Figure 8:
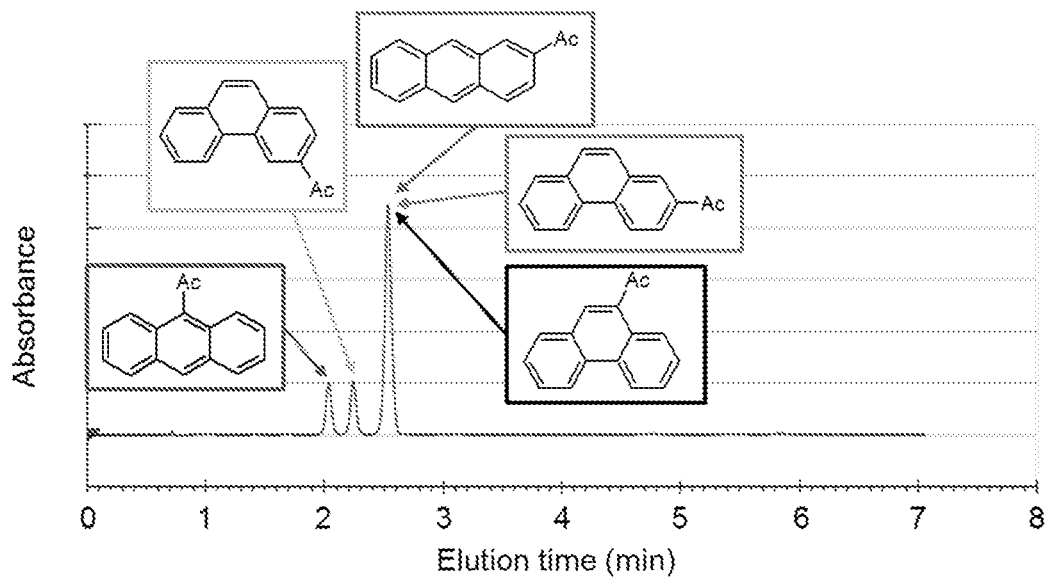
FIG. 8 shows the separation of acetylanthracene isomers and acetylphenanthrene isomers by SFC using a poly(2-vinylpyridine)-bonded silica gel as the stationary phase.

FIG. 8 shows the results of SFC with $CO_2$/methanol (97:3, v/v). Chromatography was carried out under the following conditions: flow rate, 4 mL/min; temperature, 40° C.; back pressure, 150 bar. The peaks are, from the left: 9-acetylanthracene, 3-acetylphenanthrene, and 2-acetylanthracene/2-acetylphenanthrene/9-acetylphenanthrene (the elution peaks for which are overlapping). Detection was carried out by UV at 254 nm.

Figure 9:
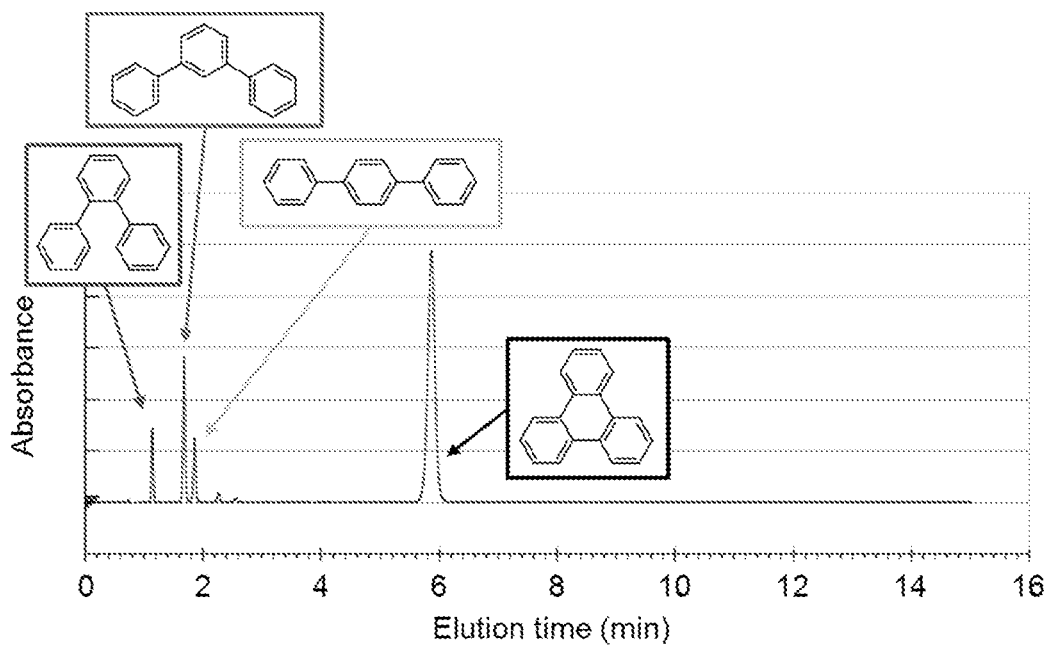
FIG. 9 shows the separation of terphenyl isomers and triphenylene by SFC using a poly(2-vinylpyridine)-bonded silica gel as the stationary phase.

FIG. 9 shows the results of SFC using poly(2-vinylpyridine)-bonded silica gel as the stationary phase. Chromatography was carried out under the following conditions: eluant, $CO_2$/methanol (97:3, v/v); flow rate, 4 mL/min; temperature, 40° C.; back pressure, 150 bar. The peaks are, from the left: o-terphenyl, m-terphenyl, p-terphenyl, triphenylene. Detection was carried out by UV at 254 nm.

Figure 10:
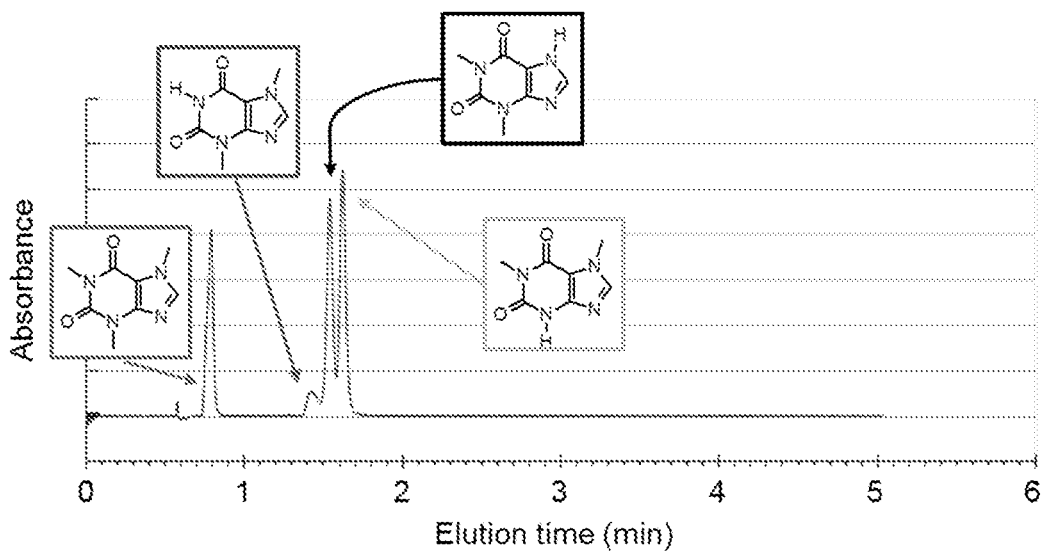
FIG. 10 shows the separation of caffeine, theophylline, theobromine and paraxanthine by SFC using a poly(2-vinylpyridine)-bonded silica gel as the stationary phase.

FIG. 10 shows the results of SFC using poly(2-vinylpyridine)-bonded silica gel as the stationary phase. Chromatography was carried out under the following conditions: eluant, $CO_2$/methanol (90:10, v/v); flow rate, 4 mL/min; temperature, 40° C.; back pressure, 150 bar. The peaks are, from the left: caffeine, theobromine, theophylline, paraxanthine. Detection was carried out by UV at 254 nm.

Figure 11:
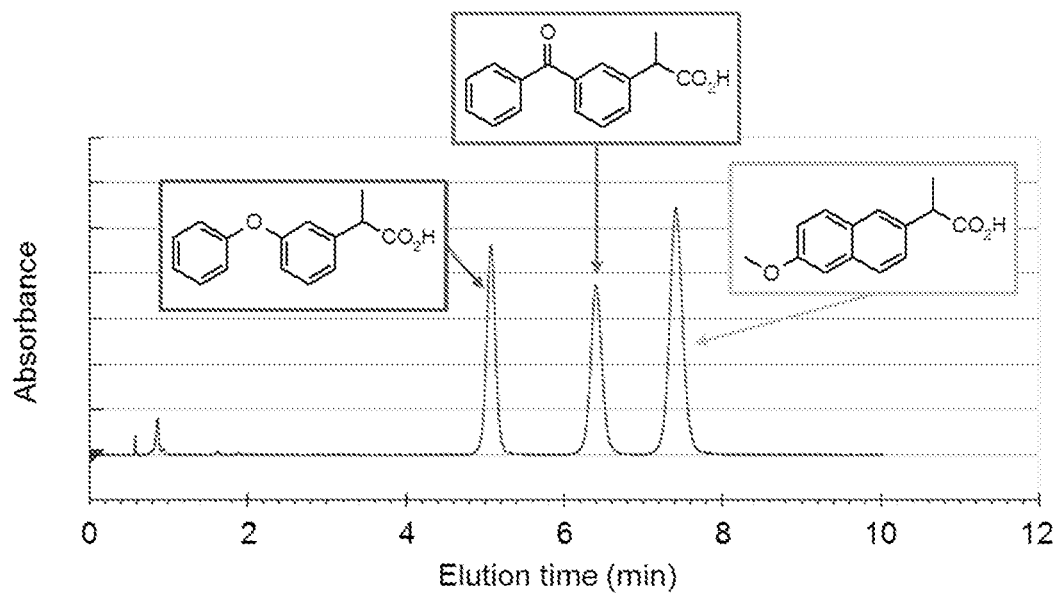
FIG. 11 shows the separation of fenoprofen, ketoprofen and naproxen by SFC using a poly(2-vinylpyridine)-bonded silica gel as the stationary phase.

FIG. 11 shows the results of SFC using poly(2-vinylpyridine)-bonded silica gel as the stationary phase. Chromatography was carried out under the following conditions: eluant, $CO_2$/methanol (90:10, v/v); flow rate, 4 mL/min; temperature, 40° C.; back pressure, 150 bar. The peaks are, from the left: fenoprofen, ketoprofen, naproxen. Detection was carried out by UV at 210 nm.

Example 3

An amount of 2.06 g of acrylamide-treated silica gel obtained by a method similar to that in Preparation Example 1 (average particle size, 5 μm; average pore size, 300 Å) was placed in a flask, and deaeration followed by a nitrogen purge was carried out. To this were added, in order: 3.23 mL of N,N-dimethylformamide, 0.2 mL of tetralin and 1.07 mL of 3-vinylpyridine under a nitrogen atmosphere. Last of all, 0.50 mL of an N,N-dimethylformamide solution of azobisisobutyronitrile adjusted to 0.5 M was added and the flask was heated on an oil bath to 60° C. and held at that level for 6 hours. Following the end of copolymerization, the resulting powder was filtered and collected with a glass filter, and then washed three times with 50 mL of methanol. The stationary phase thus obtained was vacuum dried overnight at 60° C.

Given that the carbon content of the resulting silica gel was 8.11 mass % and the carbon content of the starting silica gel was 2.88 mass %, about 7.3 mass % of poly(3-vinylpyridine) was assumed to be bonded.

The resulting poly(3-vinylpyridine)-bonded silica gel had a specific surface area of 116 m$^2$/g and the average particle size was regarded to be 5

This poly(3-vinylpyridine)-bonded silica gel can be assumed to have the following structure.

[C13]

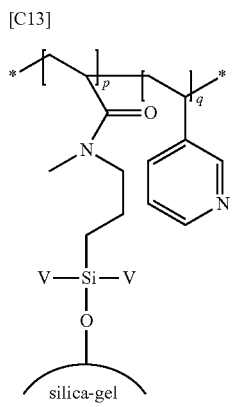

As in Examples 1 and 2, the resulting poly(3-vinylpyridine)-bonded silica gel stationary phase was slurry packed into a 150 mm×4.6 mm ID column, and evaluated by SFC.

Figure 12:
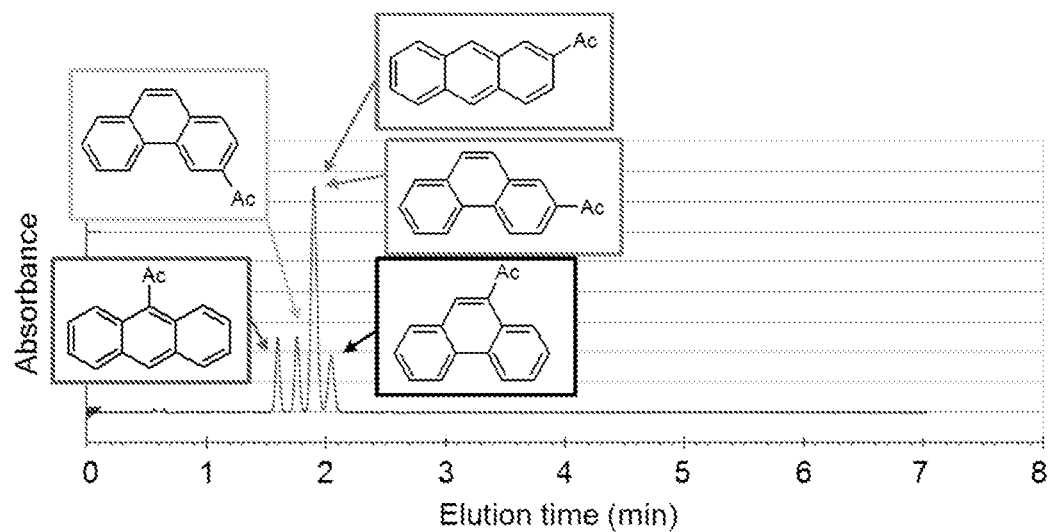
FIG. 12 shows the separation of acetylanthracene isomers and acetylphenanthrene isomers by SFC using a poly(3-vinylpyridine)-bonded silica gel as the stationary phase.

FIG. 12 shows the results of SFC with CO$_2$/methanol (97:3, v/v). Chromatography was carried out under the following conditions: flow rate, 4 mL/min; temperature, 40° C.; back pressure, 150 bar. The peaks are, from the left: 9-acetylanthracene, 3-acetylphenanthrene, 2-acetylanthracene/2-acetylphenanthrene (the elution peaks for which are overlapping), and 9-acetylphenanthrene. Detection was carried out by UV at 254 nm.

Figure 13:
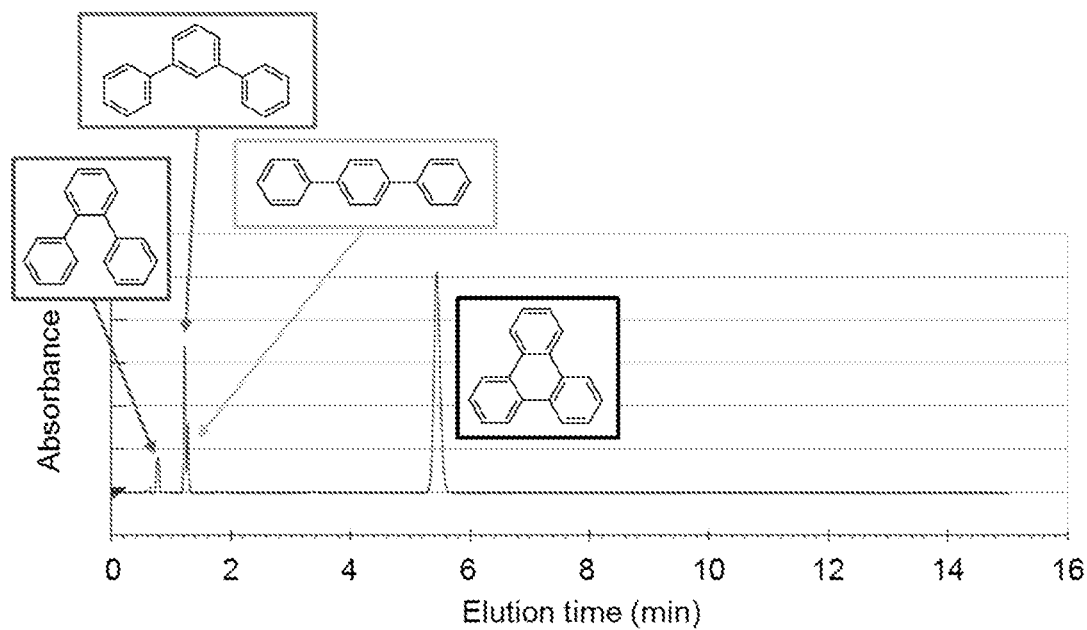
FIG. 13 shows the separation of terphenyl isomers and triphenylene by SFC using a poly(3-vinylpyridine)-bonded silica gel as the stationary phase.

FIG. 13 shows the results of SFC using poly(3-vinylpyridine)-bonded silica gel as the stationary phase. Chromatography was carried out under the following conditions: eluant, CO$_2$/methanol (97:3, v/v); flow rate, 4 mL/min; temperature, 40° C.; back pressure, 150 bar. The peaks are, from the left: o-terphenyl, m-terphenyl, p-terphenyl, triphenylene. Detection was carried out by UV at 254 nm.

Figure 14:
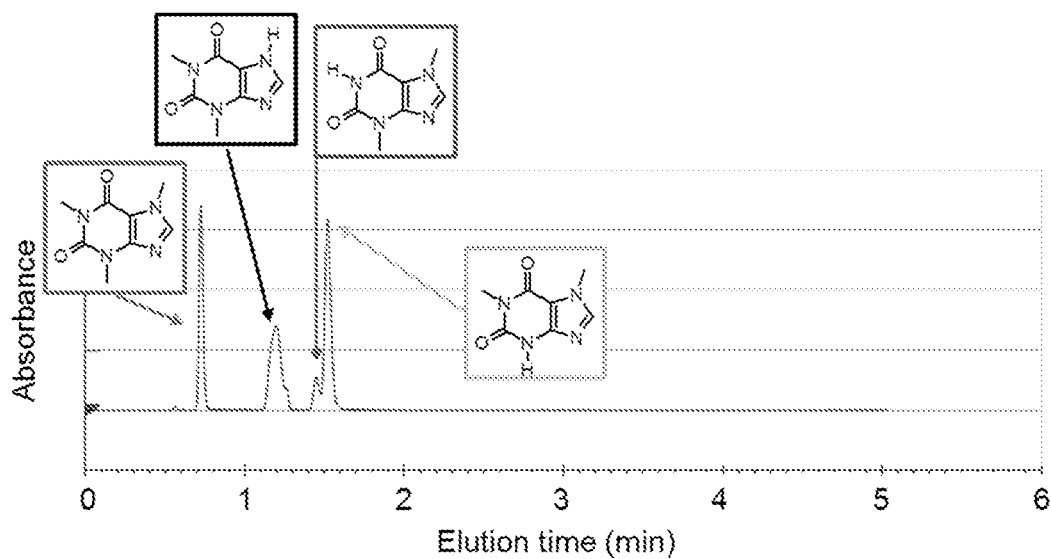
FIG. 14 shows the separation of caffeine, theophylline, theobromine and paraxanthine by SFC using a poly(3-vinylpyridine)-bonded silica gel as the stationary phase.

FIG. 14 shows the results of SFC using poly(3-vinylpyridine)-bonded silica gel as the stationary phase. Chromatography was carried out under the following conditions: eluant, CO$_2$/methanol (90:10, v/v); flow rate, 4 mL/min; temperature, 40° C.; back pressure, 150 bar. The peaks are, from the left: caffeine, theophylline, theobromine, paraxanthine. Detection was carried out by UV at 254 nm.

Figure 15:
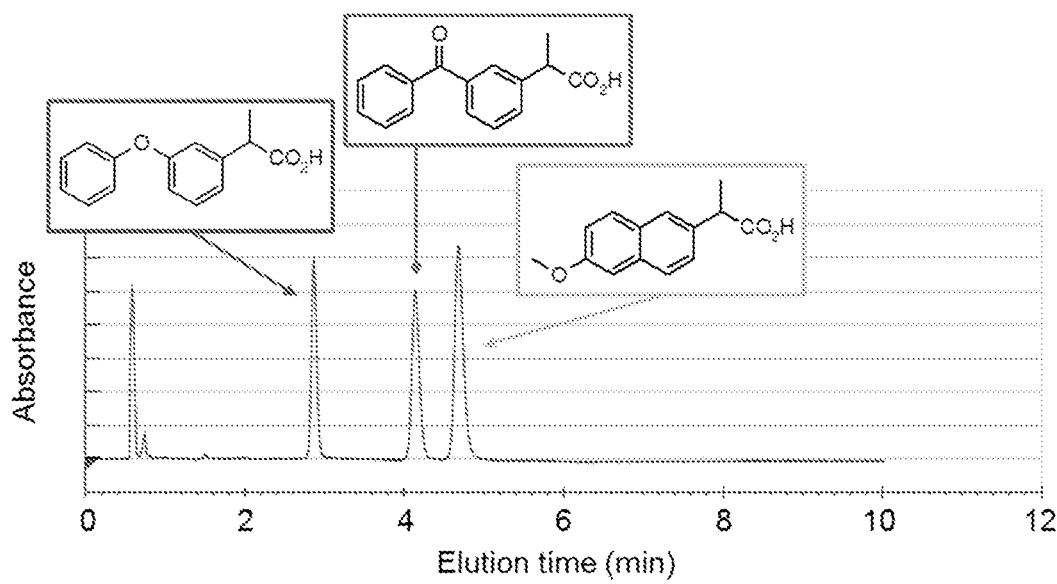
FIG. 15 shows the separation of fenoprofen, ketoprofen and naproxen by SFC using a poly(3-vinylpyridine)-bonded silica gel as the stationary phase.

FIG. 15 shows the results of SFC using poly(3-vinylpyridine)-bonded silica gel as the stationary phase. Chromatography was carried out under the following conditions: eluant, CO$_2$/methanol (90:10, v/v); flow rate, 4 mL/min; temperature, 40° C.; back pressure, 150 bar. The peaks are, from the left: fenoprofen, ketoprofen, naproxen. Detection was carried out by UV at 210 nm.

Example 4

An amount of 2.02 g of acrylamide-treated silica gel obtained by a method similar to that in Preparation Example 1 (average particle size, 5 μm; average pore size, 300 Å) was placed in a flask, and deaeration followed by a nitrogen purge was carried out. To this were added, in order: 3.40 mL of N,N-dimethylformamide, 0.2 mL of tetralin and 0.91 mL of 1-vinylimidazole under a nitrogen atmosphere. Last of all, 0.50 mL of an N,N-dimethylformamide solution of azobisisobutyronitrile adjusted to 0.5 M was added and the flask was heated on an oil bath to 60° C. and held at that level for 6 hours. Following the end of copolymerization, the resulting powder was filtered and collected with a glass filter, and then washed three times with 50 mL of methanol. The stationary phase thus obtained was vacuum dried overnight at 60° C.

Given that the carbon content of the resulting silica gel was 8.88 mass % and the carbon content of the starting silica gel was 3.04 mass %, about 10.6 mass % of poly(1-vinylimidazole) was assumed to be bonded.

The resulting poly(1-vinylimidazole)-bonded silica gel had a specific surface area of 116 m$^2$/g and the average particle size was regarded to be 5 μm.

This poly(1-vinylimidazole)-bonded silica gel can be assumed to have the following structure.

[C14]

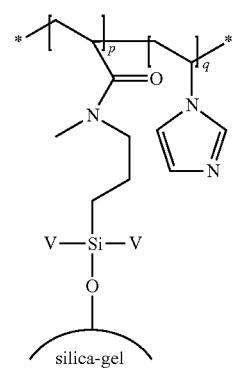

As in Examples 1 to 3, the resulting poly(1-vinylimidazole)-bonded silica gel stationary phase was slurry packed into a 150 mm×4.6 mm ID column, and evaluated by SFC.

Figure 16:
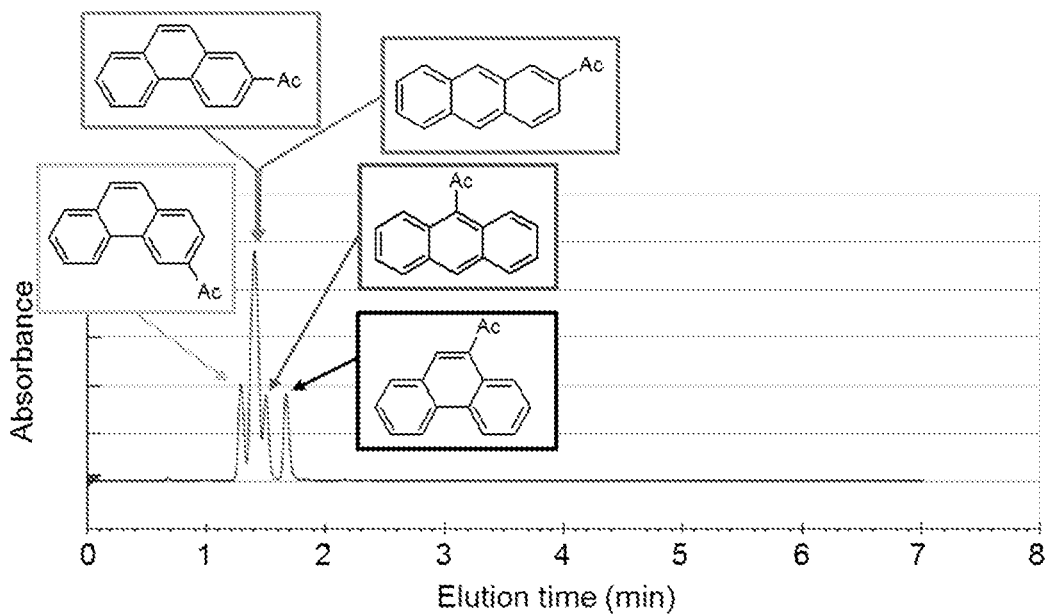
FIG. 16 shows the separation of acetylanthracene isomers and acetylphenanthrene isomers by SFC using a poly(l-vinylimidazole)-bonded silica gel as the stationary phase.

FIG. 16 shows the results of SFC with CO$_2$/methanol (97:3, v/v). Chromatography was carried out under the following conditions: flow rate, 4 mL/min; temperature, 40° C.; back pressure, 150 bar. The peaks are, from the left: 3-acetylphenanthrene, 2-acetylphenanthrene/2-acetylanthracene (the elution peaks for which are overlapping), 9-acetylanthracene, 9-acetylphenanthrene. Detection was carried out by UV at 254 nm.

Figure 17:
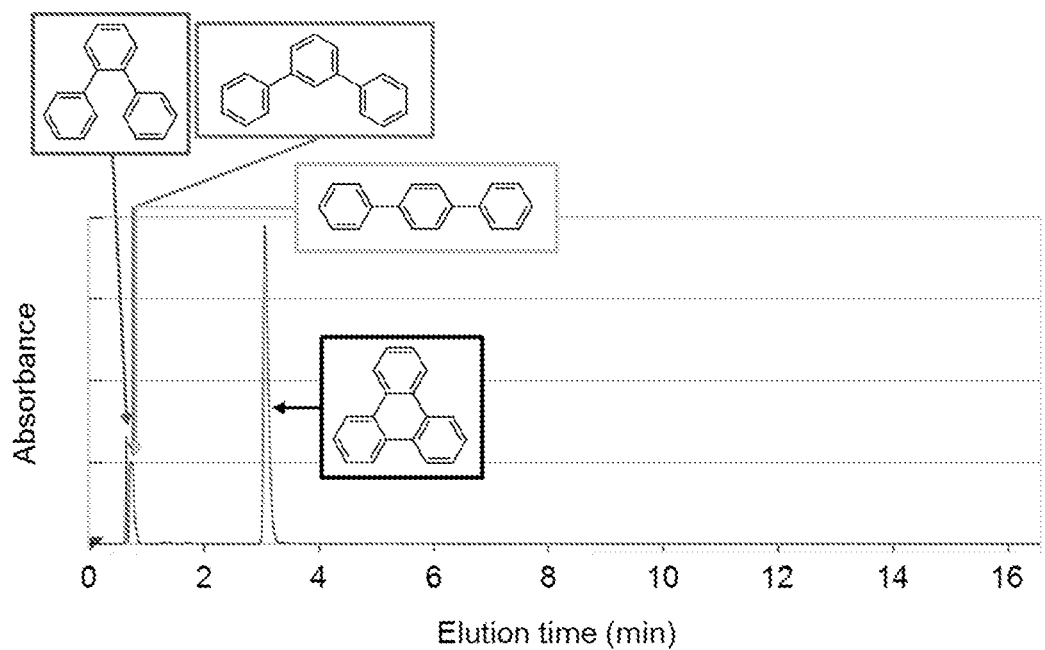
FIG. 17 shows the separation of terphenyl isomers and triphenylene by SFC using a poly(l-vinylimidazole)-bonded silica gel as the stationary phase.

FIG. 17 shows the results of SFC using poly(l-vinylimidazole)-bonded silica gel as the stationary phase. Chromatography was carried out under the following conditions: eluant, $CO_2$/methanol (97:3, v/v); flow rate, 4 mL/min; temperature, 40° C.; back pressure, 150 bar. The peaks are, from the left: o-terphenyl, m-terphenyl, p-terphenyl, triphenylene. Detection was carried out by UV at 254 nm.

Figure 18:
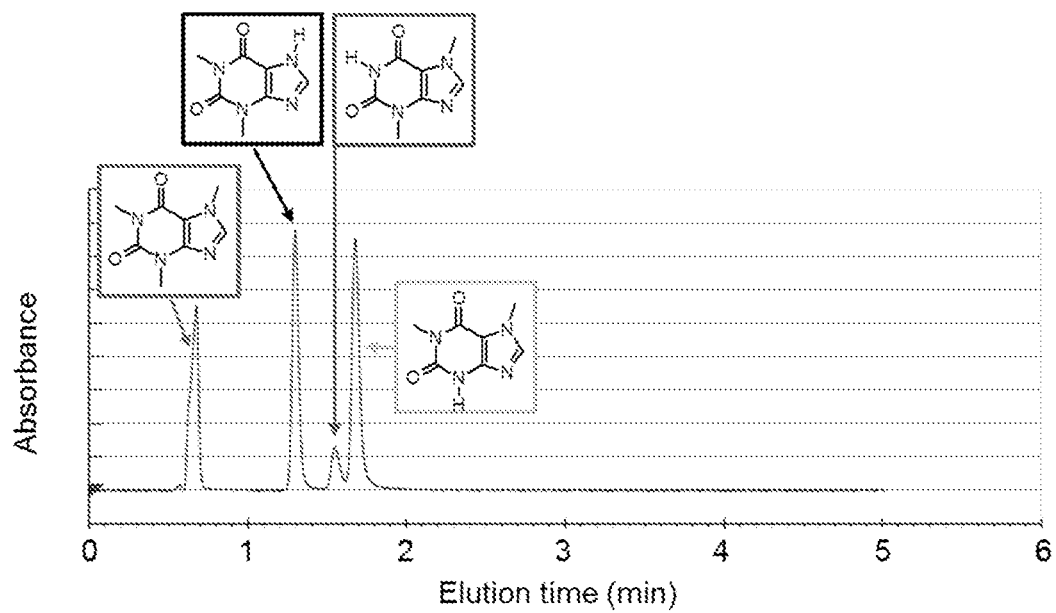
FIG. 18 shows the separation of caffeine, theophylline, theobromine and paraxanthine by SFC using a poly(l-vinylimidazole)-bonded silica gel as the stationary phase.

FIG. 18 shows the results of SFC using poly(l-vinylimidazole)-bonded silica gel as the stationary phase. Chromatography was carried out under the following conditions: eluant, $CO_2$/methanol (90:10, v/v); flow rate, 4 mL/min; temperature, 40° C.; back pressure, 150 bar. The peaks are, from the left: caffeine, theophylline, theobromine, paraxanthine. Detection was carried out by UV at 254 nm.

Figure 19:
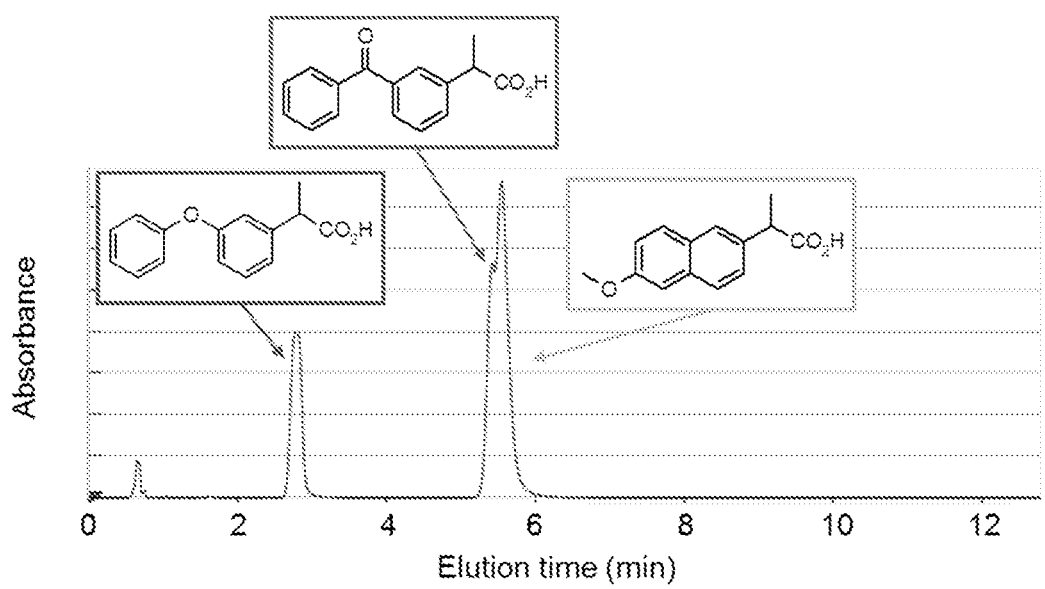
FIG. 19 shows the separation of fenoprofen, ketoprofen and naproxen by SFC using a poly(l-vinylimidazole)-bonded silica gel as the stationary phase.

FIG. 19 shows the results of SFC using poly(l-vinylimidazoline)-bonded silica gel as the stationary phase. Chromatography was carried out under the following conditions: eluant, $CO_2$/methanol (90:10, v/v); flow rate, 4 mL/min; temperature, 40° C.; back pressure, 150 bar. The peaks are, from the left: fenoprofen, ketoprofen, naproxen. Detection was carried out by UV at 210 nm.

Figure 20:
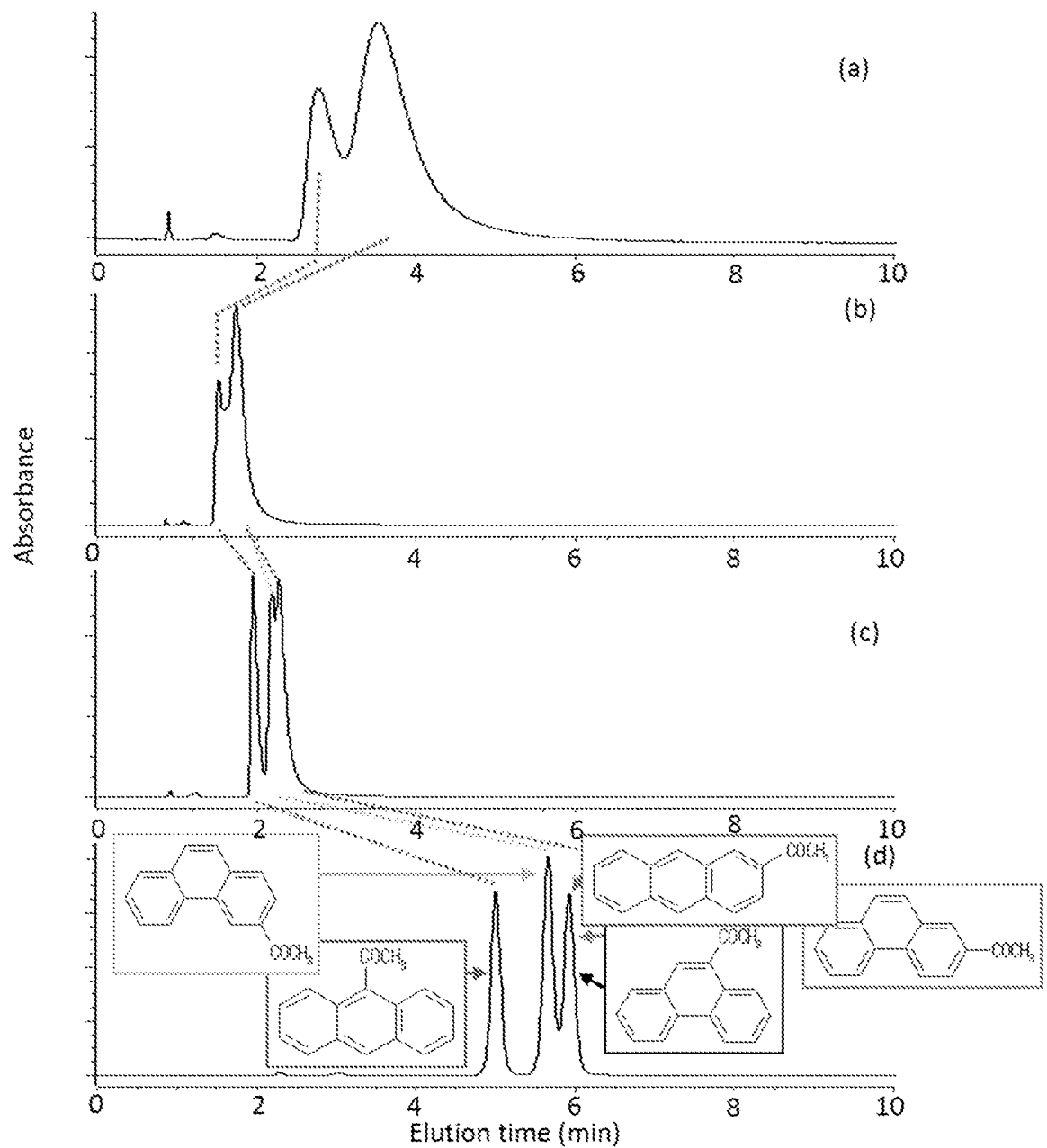
FIG. 20 shows the contrast in separation by HPLC between a 2-ethylpyridine separation medium and stationary phases of the invention.

FIG. 20 shows the results obtained in comparative examples of the separation of acetylphenanthrene and acetylanthracene isomers using the stationary phases synthesized in Examples 1 to 3 as the stationary phase in high-performance liquid chromatography. Chromatography was carried out under the following conditions: mobile phase, n-hexane/ethyl acetate (90:10, v/v); flow rate, 1 mL/min; temperature, 25° C. The elution profiles shown are, from the top: (a) poly(4-vinylpyridine stationary phase), (b) poly(2-vinylpyridine stationary phase), (c) poly(3-vinylpyridine stationary phase), (d) commercial 2-pyridylethyl stationary phase (shown in formula below).

[C15]

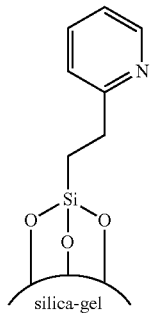

Figure 21:
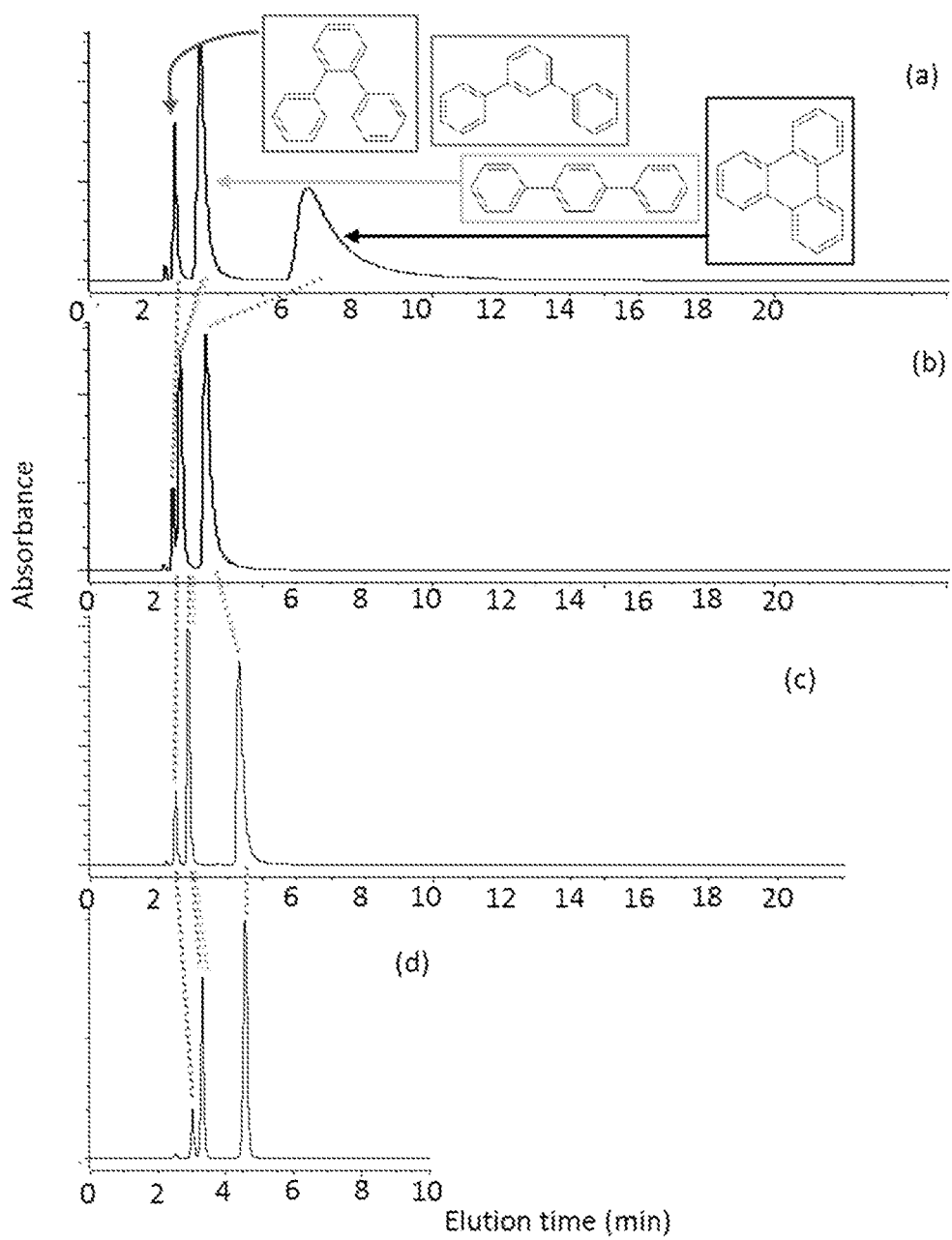
FIG. 21 shows the contrast in separation by HPLC between a 2-ethylpyridine separation medium and stationary phases of the invention.

FIG. 21 shows the results obtained in comparative examples of the separation of terphenyl isomers and triphenylene using the stationary phases synthesized in Examples 1 to 3 as the stationary phase in high-performance liquid chromatography. Chromatography was carried out under the following conditions: mobile phase, n-hexane/ethyl acetate (90:10, v/v); flow rate, 1 mL/min; temperature, 25° C. The elution profiles shown are, from the top: (a) poly(4-vinylpyridine stationary phase), (b) poly(2-vinylpyridine stationary phase), (c) poly(3-vinylpyridine stationary phase), (d) commercial 2-pyridylethyl stationary phase.

Figure 22:
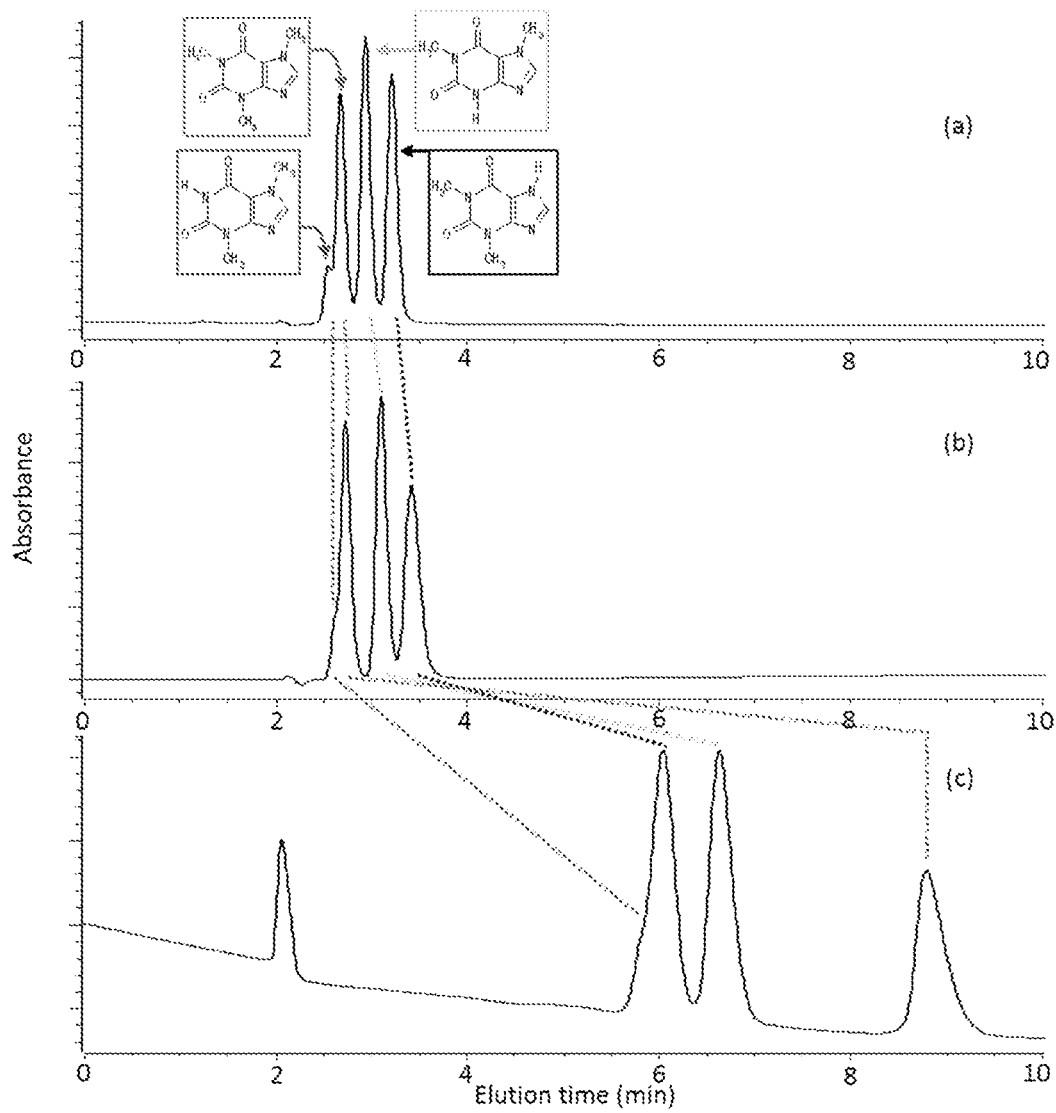
FIG. 22 shows the contrast in separation by HPLC between a 2-ethylpyridine separation medium and stationary phases of the invention.

FIG. 22 shows the results obtained in comparative examples of the separation of caffeine, theophylline, theobromine and paraxanthine using the stationary phases synthesized in Examples 2 and 3 as the stationary phase in high-performance liquid chromatography. Chromatography was carried out under the following conditions: mobile phase, water/methanol (90:10, v/v); flow rate, 1 mL/min; temperature, 25° C. The elution profiles shown are, from the top: (a) poly(2-vinylpyridine stationary phase), (b) poly(3-vinylpyridine stationary phase), (d) commercial 2-pyridylethyl stationary phase.

Figure 23:
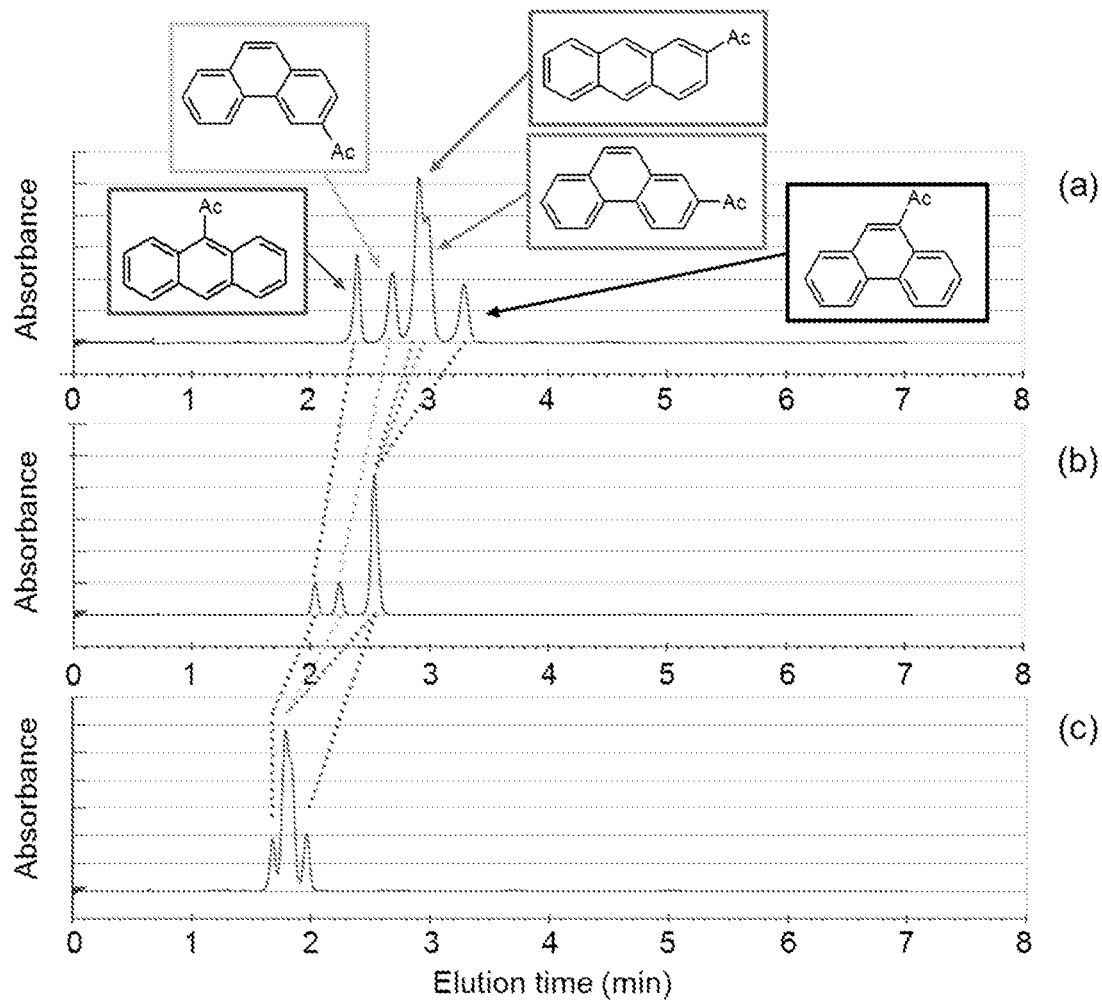
FIG. 23 shows the contrast in the separation of acetylanthracene isomers and acetylphenanthrene isomers by SFC between a 2-ethylpyridine separation medium and stationary phases of the invention.

FIG. 23 shows the contrast in separation of acetylanthracene isomers and acetylphenanthrene isomers by SFC using the stationary phase in Example 1, the stationary phase in Example 2, and a commercial 2-ethylpyridine stationary phase ((a): Example 1; (b) Example 2; (c) comparative example). Column size: 150 mm×4.6 mm ID; mobile phase, $CO_2$/methanol=97:3; flow rate, 4 mL/min; back pressure, 150 bar; temperature, 40° C. Detection was carried out with UV at 254 nm.

Figure 24:
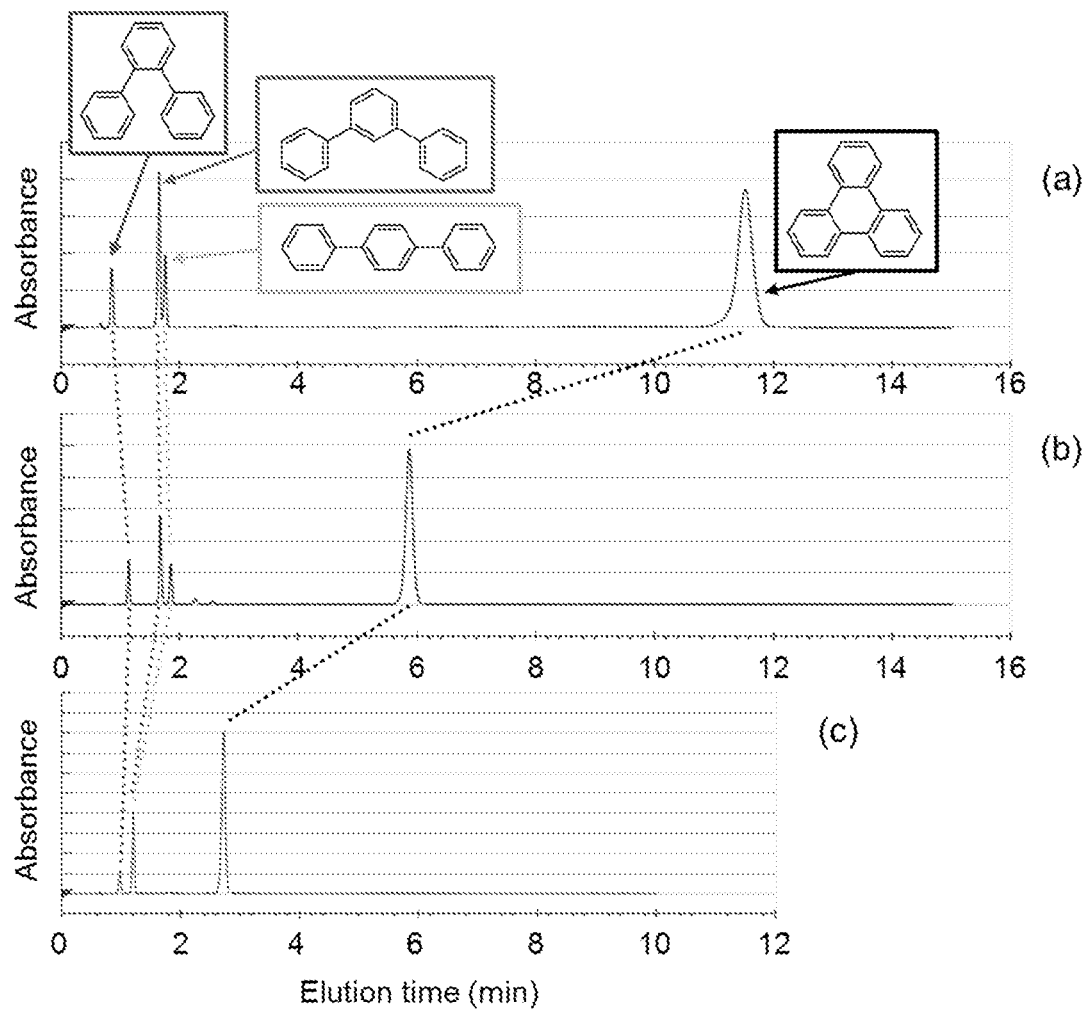
FIG. 24 shows the contrast in the separation of terphenyl isomers and triphenylene by SFC between a 2-ethylpyridine separation medium and stationary phases of the invention.

FIG. 24 shows the contrast in separation of terphenyl isomers and triphenylene by SFC using the stationary phase in Example 1, the stationary phase in Example 2, and a commercial 2-ethylpyridine stationary phase ((a): Example 1; (b) Example 2; (c) comparative example). Column size: 150 mm×4.6 mm ID; mobile phase, $CO_2$/methanol=97:3; flow rate, 4 mL/min; back pressure, 150 bar; temperature, 40° C. Detection was carried out with UV at 254 nm.

Figure 25:
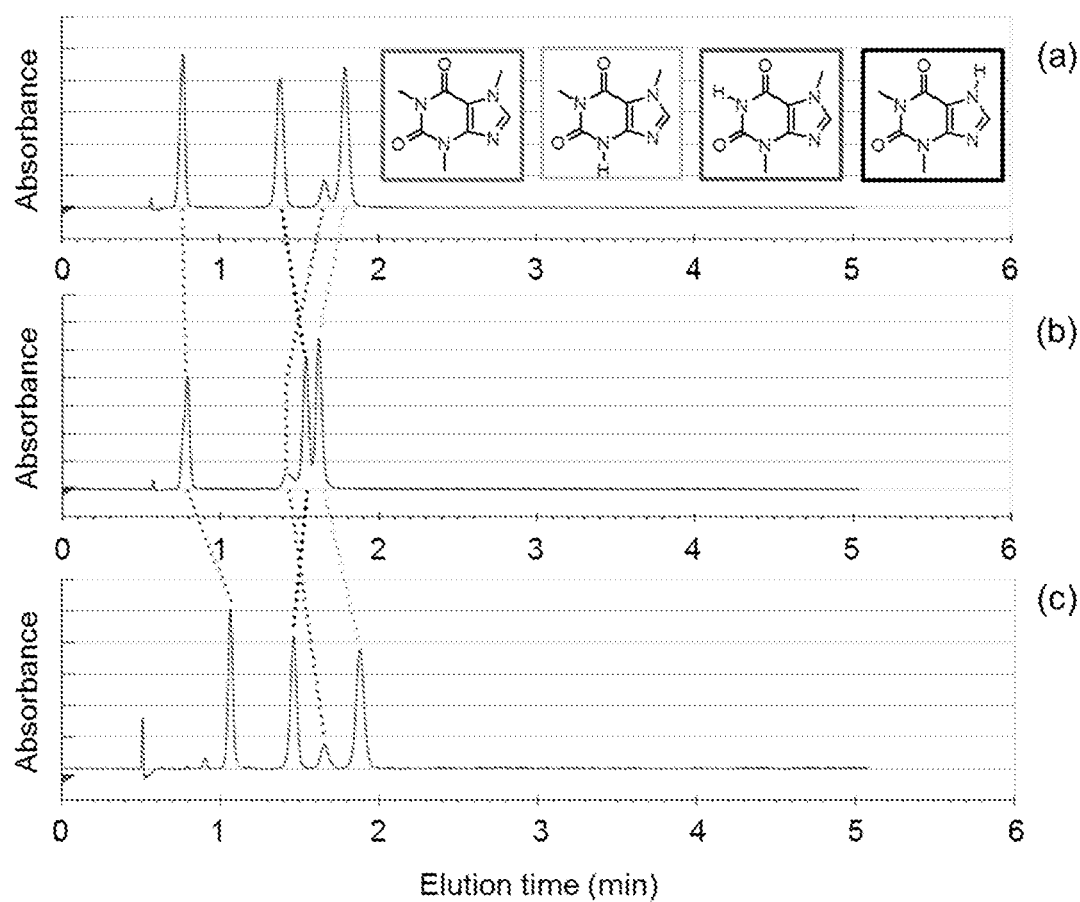
FIG. 25 shows the contrast in the separation of caffeine, theophylline, theobromine and paraxanthine by SFC between a 2-ethylpyridine separation medium and stationary phases of the invention.

FIG. 25 shows the contrast in separation of caffeine, theophylline, theobromine and paraxanthine by SFC using the stationary phase in Example 1, the stationary phase in Example 2, and a commercial 2-ethylpyridine stationary phase ((a): Example 1; (b) Example 2; (c) comparative example).

Column size: 150 mm×4.6 mm ID; mobile phase, $CO_2$/methanol=90:10; flow rate, 4 mL/min; back pressure, 150 bar; temperature, 40° C. Detection was carried out with UV at 254 nm.

Figure 26:
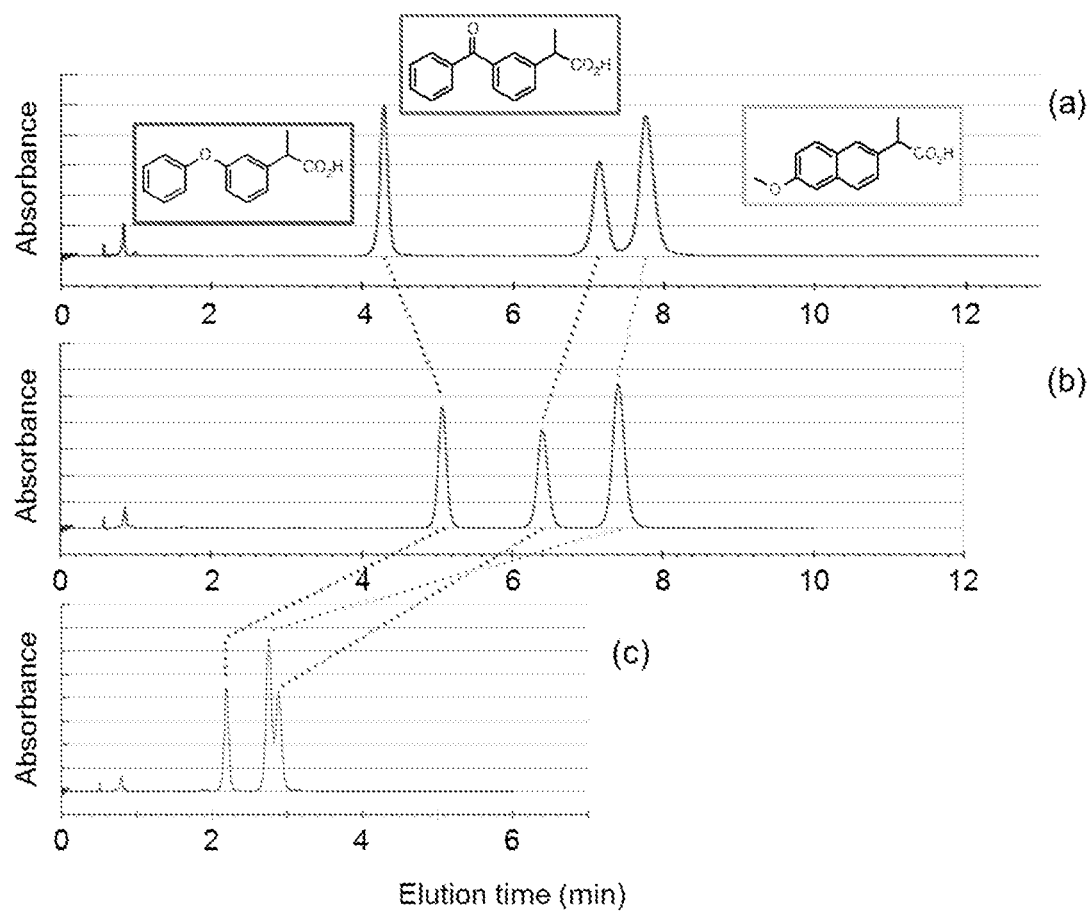
FIG. 26 shows the contrast in the separation of fenoprofen, ketoprofen and naproxen by SFC between a 2-ethylpyridine separation medium and stationary phases of the invention.

FIG. 26 shows the contrast in separation of fenoprofen, ketoprofen and naproxen by SFC using the stationary phase in Example 1, the stationary phase in Example 2, and a commercial 2-ethylpyridine stationary phase ((a): Example 1; (b) Example 2; (c) comparative example).

Column size: 150 mm×4.6 mm ID; mobile phase, $CO_2$/methanol=90:10; flow rate, 4 mL/min; back pressure, 150 bar; temperature, 40° C. Detection was carried out with UV at 210 nm.

Figure 27:
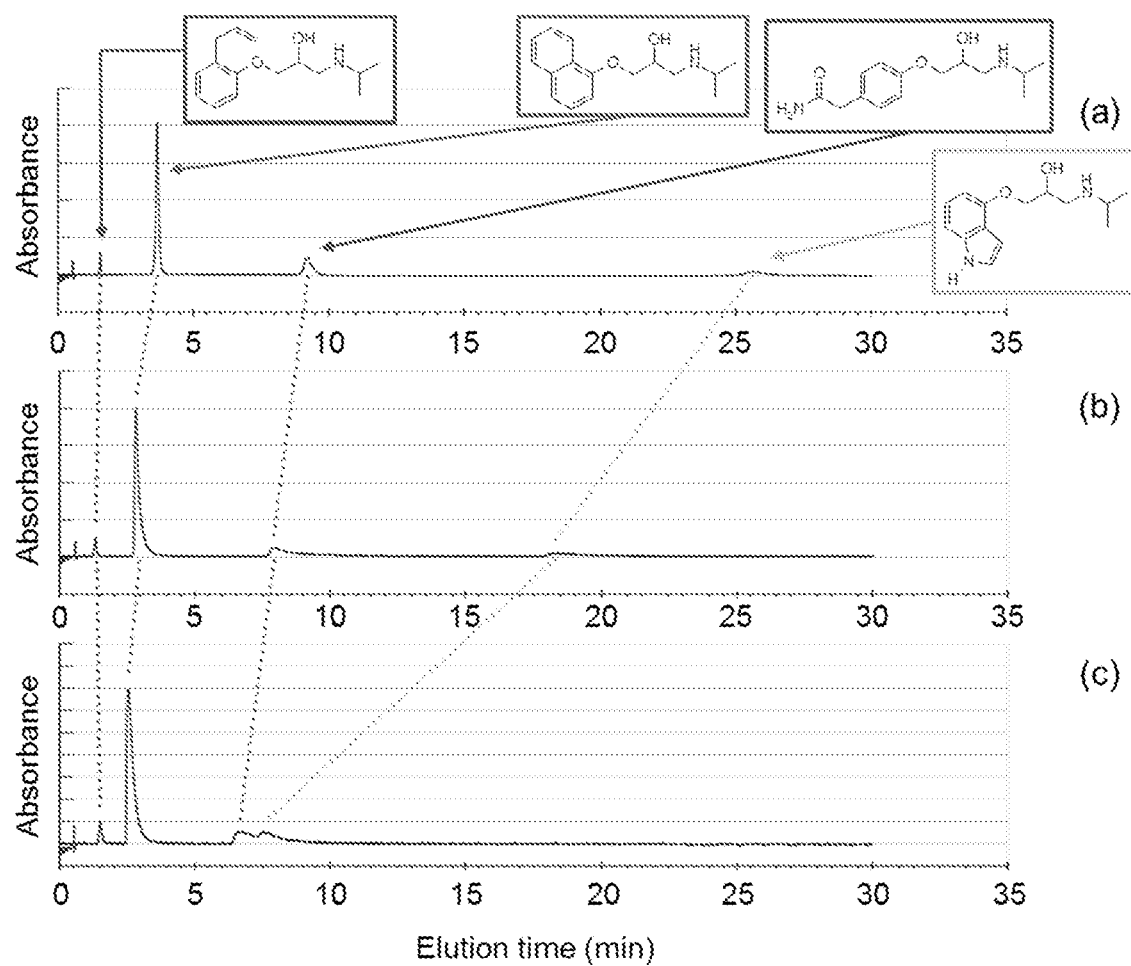
FIG. 27 shows the contrast in the separation of alprenolol, propranolol, atenolol and pindolol by SFC between a 2-ethylpyridine separation medium and stationary phases of the invention.

FIG. 27 shows the contrast in separation of alprenolol, propranolol, atenolol and pindolol by SFC using the stationary phase in Example 1, the stationary phase in Example 2, and a commercial 2-ethylpyridine stationary phase ((a): Example 1; (b) Example 2; (c) comparative example).

Column size: 150 mm×4.6 mm ID; mobile phase, $CO_2$/methanol=90:10; flow rate, 4 mL/min; back pressure, 150 bar; temperature, 40° C. Detection was carried out with UV at 230 nm.

Example 5

The synthesis of poly(4-vinylpyridine) having a trialkoxysilyl group at the starting end was carried out by the following procedure.

2,2'-Azobisisobutyronitrile (24 mg) was added to a flask, and deaeration followed by a nitrogen purge was carried out. To this were added, in order under a nitrogen atmosphere: 0.57 mL of N,N-dimethylformamide, 4.24 mL of 4-vinylpyridine and 0.19 mL of (3-mercaptopropyl)trimethoxysilane. The flask was heated on an oil bath to 60° C., and held at that level for 3 hours. Following polymerization, the flask contents were diluted with 4 mL of methanol, and then re-precipitated in 200 mL of diethyl ether. The solid recovered by filtration was dissolved once more in 6 mL of methanol, and re-precipitated in 200 mL of diethyl ether.

Characterization of the poly(4-vinylpyridine) thus obtained was carried out using ¹H-NMR. Based on the surface area ratio between the peak for methoxy groups at the starting end observed near 3.5 ppm and the peak for aromatic ring protons observed near 8.6 to 8.0 ppm, the average degree of polymerization was estimated to be 36.

Next, 1.21 g of the poly(4-vinylpyridine) having a trialkoxysilyl group at the end obtained by the above procedure and 2.07 g of silica gel (average particle size, 5 μm; average particle size, 300 Å) were placed in a flask, and deaeration followed by a nitrogen purge was carried out. To this was added 10 mL of N,N-dimethylformamide, followed by heating on an oil bath to 160° C. and 8 hours of refluxing under applied heat. Following completion of the reaction, the system was cooled to room temperature, filtered and collected with a glass filter, and then washed with 100 mL of methanol, 30 mL of toluene and 30 mL of acetone. The stationary phase thus obtained was vacuum dried overnight at 60° C.

Given that the carbon content of the resulting silica gel was 12.9 mass % and the carbon content of the poly(4-vinylpyridine) having a trimethoxysilyl group on the end was 19.9 mass %, about 18.9 mass % of poly(4-vinylimidazole) was assumed to be bonded.

The resulting poly(4-vinylpyridine)-bonded silica gel had a specific surface area of 91 m²/g and the average particle size was regarded to be 5

This poly(4-vinylpyridine)-bonded silica gel can be assumed to have the following structure.

[C16]

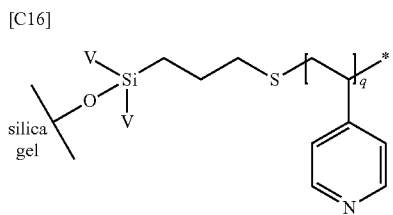

Figure 28:
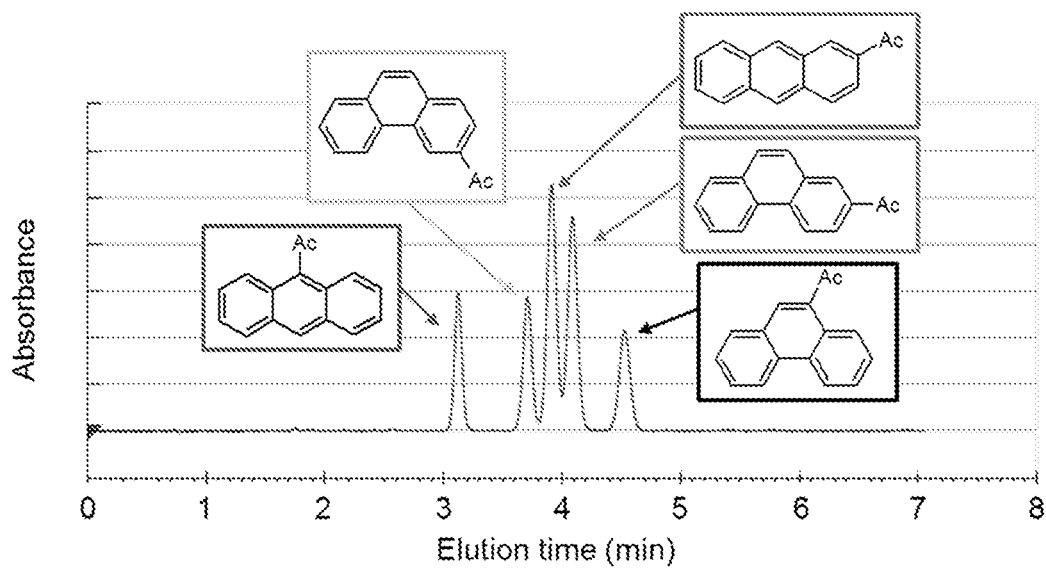
FIG. 28 shows the separation of acetylanthracene isomers and acetylphenanthrene isomers by SFC using a poly(4-vinylpyridine)-bonded silica gel (produced by Method (2)) as the stationary phase.

This poly(4-vinylpyridine)-bonded silica gel stationary phase was slurry packed into a 150 mm×4.6 mm ID column, and acetylanthracene and acetylphenanthrene isomers were separated by SFC. FIG. 28 shows the results of SFC with CO₂/methanol (97:3, v/v). Chromatography was carried out under the following conditions: flow rate, 4 mL/min; temperature, 40° C.; back pressure, 150 bar. The peaks are, from the left: 9-acetylanthracene, 3-acetylphenanthrene, 2-acetylanthracene, 2-acetylphenanthrene, 9-acetylphenanthrene. Detection was carried out by UV at 254 nm.

The stationary phase of the invention clearly exhibits a good separating ability for substitution regioisomers of closely similar structure. Given that polymers having aromatic rings and/or dipolar atomic groups thereon arrange themselves regularly to some degree, adsorption sites sensitive to the molecule shapes are thought to have formed.

Figure 29:
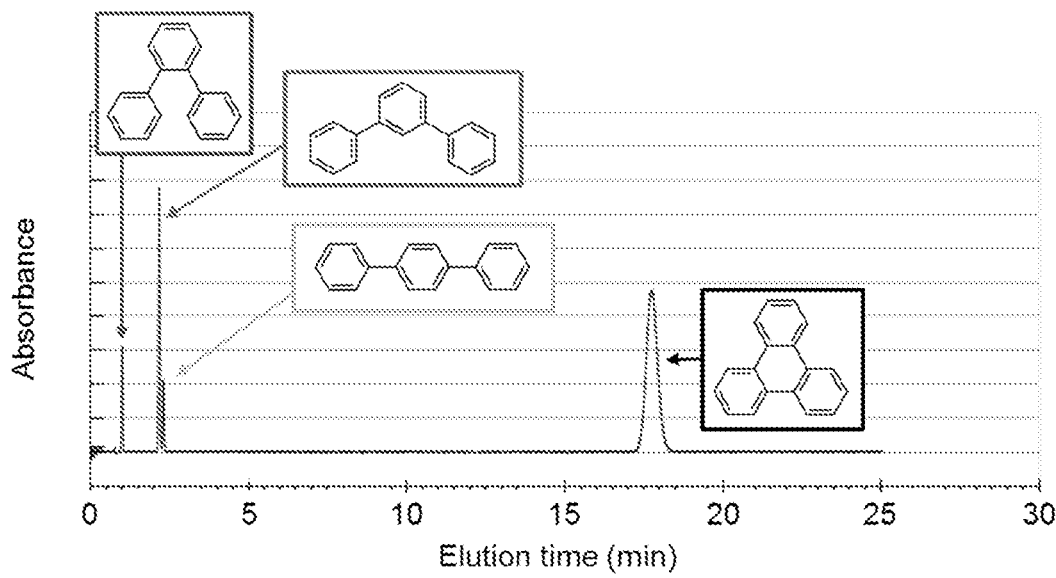
FIG. 29 shows the separation of terphenyl isomers and triphenylene by SFC using a poly(4-vinylpyridine)-bonded silica gel (produced by Method (2)) as the stationary phase.

FIG. 29 shows the results of SFC using poly(4-vinylpyridine)-bonded silica gel as the stationary phase. Chromatography was carried out under the following conditions: eluant, CO₂/methanol (97:3, v/v); flow rate, 4 mL/min; temperature, 40° C.; back pressure, 150 bar. The peaks are, from the left: o-terphenyl, m-terphenyl, p-terphenyl, triphenylene. Detection was carried out by UV at 254 nm.

Figure 30:
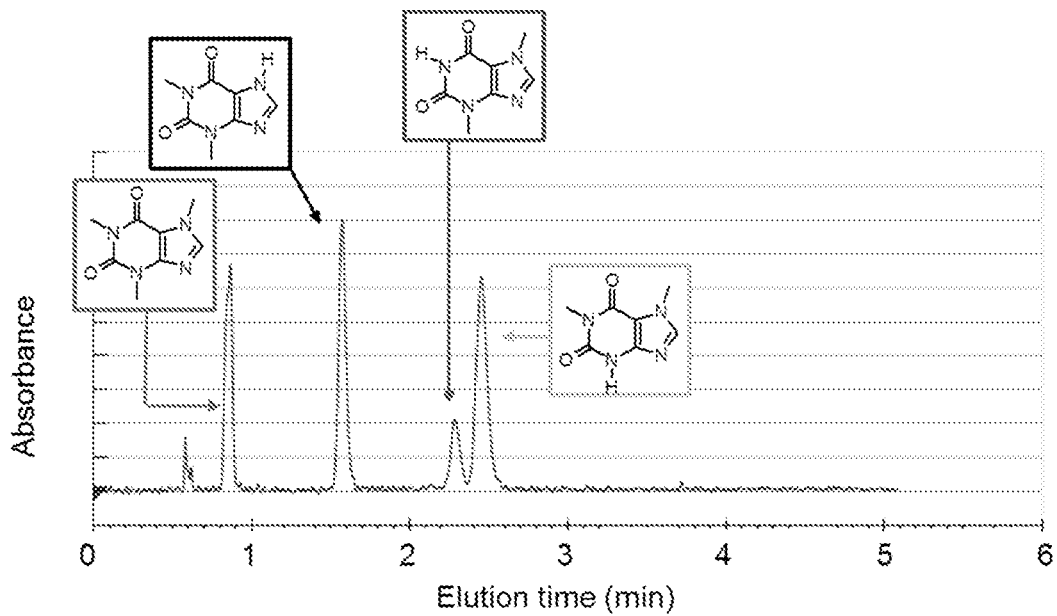
FIG. 30 shows the separation of caffeine, theophylline, theobromine and paraxanthine by SFC using a poly(4-vinylpyridine)-bonded silica gel (produced by Method (2)) as the stationary phase.

FIG. 30 shows the results of SFC using poly(4-vinylpyridine)-bonded silica gel as the stationary phase. Chromatography was carried out under the following conditions: eluant, CO₂/methanol (90:10, v/v); flow rate, 4 mL/min; temperature, 40° C.; back pressure, 150 bar. The peaks are, from the left: caffeine, theophylline, theobromine, paraxanthine. Detection was carried out by UV at 254 nm.

Figure 31:
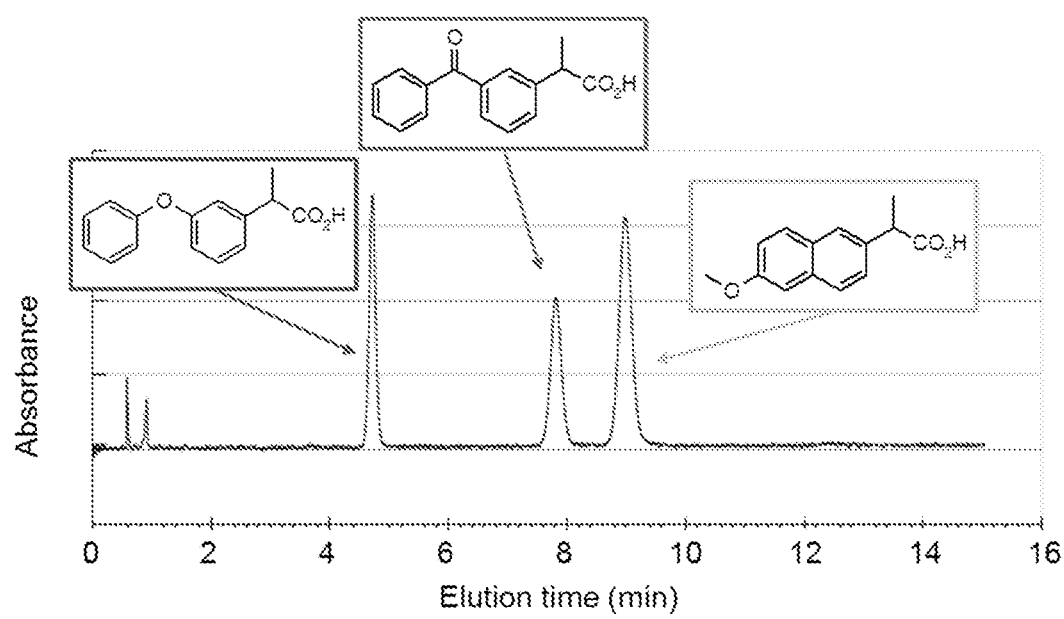
FIG. 31 shows the separation of fenoprofen, ketoprofen and naproxen by SFC using a poly(4-vinylpyridine)-bonded silica gel (produced by Method (2)) as the stationary phase.

FIG. 31 shows the results of SFC using poly(4-vinylpyridine)-bonded silica gel as the stationary phase. Chromatography was carried out under the following conditions: eluant, CO₂/methanol (90:10, v/v), flow rate, 4 mL/min; temperature, 40° C.; back pressure, 150 bar. The peaks are, from the left: fenoprofen, ketoprofen, naproxen. Detection was carried out by UV at 210 nm.

INDUSTRIAL APPLICABILITY

The stationary phase of the invention has good separation characteristics for compounds that have been difficult to separate by conventional HPLC, particularly acidic compounds, basic compounds, and also condensed ring aromatic compounds and aromatic isomers. Specifically, an improvement in the number of column plates is anticipated. It is thus expected that the stationary phase of the invention will contribute not only to the discovery and improvement of novel separation conditions for various substances that have hitherto been difficult to separate, but also to improvements in the convenience of identification and analysis of separated substances.

The invention claimed is:

1. A stationary phase for supercritical fluid chromatography, comprising a support to which is bonded a polymer that includes a nitrogen-containing aromatic ring on repeating units of the main chain, and
the stationary phase has a structure represented by Formula (II):

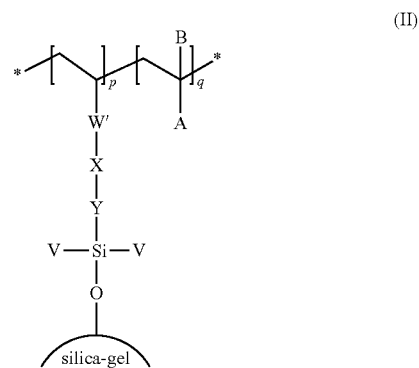

in Formula (II), W' is a single bond or an alkylene group of 1 to 10 carbon atoms which may have a branched chain; X is an amide group, an ester group, an N-alkylamide group of 1 to 3 carbon atoms, an ether group, a sulfoxide group, a sulfone group, a sulfide group or a phosphoric acid ester group; Y is an alkylene group of 1 to 30 carbon atoms; A is a group having a nitrogen-containing aromatic ring; B is a hydrogen atom, a methyl group or an ethyl group; V is an ether group bonded to the silica gel, or an alkoxy group of 1 to 5 carbons, a halogen, an alkylmercaptyl group of 1 to 20 carbon atoms, a nitrogen-containing group, an allyl group, a 2-methyl-2-propenyl group or an alkyl group of 1 to 3 carbon atoms; p is 1 to 10; and q is 10 to 300.

2. The stationary phase for supercritical fluid chromatography according to claim 1, wherein the nitrogen-containing aromatic ring is a group having a heterocyclic structure selected from pyridyl, imidazole, carbazole and pyrazyl groups.

3. The stationary phase for supercritical fluid chromatography according to claim 1, which is in the form of spherical particles.

4. The stationary phase for supercritical fluid chromatography according to claim 3, which has an average particle size of from 0.1 μm to 1,000 μm.

5. The stationary phase for supercritical fluid chromatography according to claim 1, which is monolithic.

6. A method for separating a target substance, the method comprising a step of separating the target substance using the stationary phase according to claim 1 and a supercritical fluid-containing mobile phase.

* * * * *